US012580383B2

(12) United States Patent
Tateiwa et al.

(10) Patent No.: US 12,580,383 B2
(45) Date of Patent: Mar. 17, 2026

(54) CONTROL METHOD, MANAGEMENT DEVICE, NON-TRANSITORY COMPUTER READABLE STORAGE MEDIUM AND POWER SYSTEM FOR DISTRIBUTING SURPLUS POWER

(71) Applicant: Tokyo Electric Power Company Holdings, Incorporated, Tokyo (JP)

(72) Inventors: Kenji Tateiwa, Tokyo (JP); Koichiro Yamaki, Tokyo (JP)

(73) Assignee: Tokyo Electric Power Company Holdings, Incorporated, Tokyo (JP)

( * ) Notice: Subject to any disclaimer, the term of this patent is extended or adjusted under 35 U.S.C. 154(b) by 467 days.

(21) Appl. No.: 18/032,695

(22) PCT Filed: Nov. 20, 2020

(86) PCT No.: PCT/JP2020/043395
§ 371 (c)(1),
(2) Date: Apr. 19, 2023

(87) PCT Pub. No.: WO2022/107313
PCT Pub. Date: May 27, 2022

(65) Prior Publication Data
US 2023/0387682 A1 Nov. 30, 2023

(51) Int. Cl.
*G06Q 10/0631* (2023.01)
*G06Q 20/06* (2012.01)
(Continued)

(52) U.S. Cl.
CPC ...... *H02J 3/0012* (2020.01); *G06Q 10/06312* (2013.01); *G06Q 20/065* (2013.01);
(Continued)

(58) Field of Classification Search
CPC .... H02J 3/0012; H02J 13/00002; H02J 15/00; H02J 50/80; H02J 3/14; G06Q 20/065;
(Continued)

(56) References Cited

U.S. PATENT DOCUMENTS 10,628,762 B2 * 4/2020 Helsel .............. G06Q 10/06312
11,294,254 B2 * 4/2022 Patterson ................ G02F 1/163
(Continued)

FOREIGN PATENT DOCUMENTS

EP          2704283 A1      3/2014
JP      2011-004476 A      1/2011
(Continued)

OTHER PUBLICATIONS

WIPO English translation of JP2011004476 (Year: 2009).*
English translation of International Search Report for PCT Application No. PCT/JP2020/043395 mailed Dec. 28, 2020.

*Primary Examiner* — Alvin H Tan
(74) *Attorney, Agent, or Firm* — Bret E. Field; Bozicevic, Field & Francis LLP

(57) ABSTRACT

A control method for causing a computer to execute processing of:
acquiring supply information indicating supply power supplied to a power grid and grid information indicating a grid capacity of the power grid;
determining whether or not the supply power exceeds the grid capacity based on the supply information and the grid information; and if it is determined that the grid capacity is exceeded, performing control so that surplus power exceeding the grid capacity is supplied to a computing device constituting a predetermined distributed computing system.

22 Claims, 21 Drawing Sheets

(51) Int. Cl.
  *G06Q 20/38* (2012.01)
  *G06Q 50/06* (2012.01)
  *H02J 3/0012* (2026.01)
  *H02J 13/12* (2026.01)

(52) U.S. Cl.
  CPC .......... *G06Q 20/389* (2013.01); *G06Q 50/06*
     (2013.01); *H02J 13/12* (2026.01)

(58) Field of Classification Search
  CPC . G06Q 20/389; G06Q 50/26; G06Q 10/06312
  See application file for complete search history.

(56) References Cited

U.S. PATENT DOCUMENTS

| | | | | |
|---|---|---|---|---|
| 11,447,032 B2 * | 9/2022 | Oshima | ................. | B60L 53/665 |
| 11,462,909 B2 * | 10/2022 | Dudding | ................... | H02J 3/16 |
| 2018/0088642 A1 | 3/2018 | Ding | | |
| 2021/0027223 A1 * | 1/2021 | Koide | .................... | G06Q 10/04 |
| 2021/0194262 A1 | 6/2021 | Ogura | | |

FOREIGN PATENT DOCUMENTS

| | | | |
|---|---|---|---|
| JP | 2012-196116 | A | 10/2012 |
| JP | 2018-57251 | A | 4/2018 |
| JP | 2018-169860 | A | 11/2018 |
| JP | 6522820 | B1 | 5/2019 |
| JP | 2019-101797 | A | 6/2019 |
| JP | 2019-153032 | A | 9/2019 |
| JP | 2020-76654 | A | 5/2020 |
| WO | WO2012147155 | A1 | 11/2012 |
| WO | WO2017138629 | A1 | 8/2017 |

* cited by examiner

| POWER GENERATION FACILITY ID | TYPE | CONNECTION | POWER GENERATION AMOUNT | |
|---|---|---|---|---|
| 10001 | SOLAR POWER | TRANSMISSION LINE 1 | 2019/9/1/0:00 | ××kW |
| ... | ... | ... | ... | ... |

142

| POWER GRID | DATE AND TIME | DEMAND VALUE | SUPPLY VALUE |
|---|---|---|---|
| GRID 1 | 2019/9/1/0:00 | ××MW | ××MW |
| ... | ... | ... | ... |

143

| POWER GRID | TRANSMISSION LINE /SUBSTATION | OPERATING CAPACITY | AVAILABLE CAPACITY |
|---|---|---|---|
| GRID 1 | TRANSMISSION LINE 1 | ××MW | ××MW |
| | ... | ... | ... |
| | SUBSTATION 1 | ××MW | ××MW |
| | ... | ... | ... |
| ... | ... | ... | ... |

144

| MACHINE ID | CONNECTION | POWER CONSUMPTION | COMPUTATION | MINING | | |
|---|---|---|---|---|---|---|
| 20001 | SUBSTATION 1 | ××kW/h | ××GH/h | 2019/9/1 | BTC | 0.0XX |
| ... | ... | ... | ... | ... | ... | ... |

145

| POWER STORAGE DEVICE ID | CONNECTION | RATED CAPACITY | REMAINING CAPACITY |
|---|---|---|---|
| 30001 | SUBSTATION 1 | ××kWh | ××kWh |
| ... | ... | ... | ... |

146

| TIME SLOT | PRICE |
|---|---|
| 2019/9/1/0:00-0:30 | 7.0YEN/kWh |
| ... | ... |

F I G . 4A
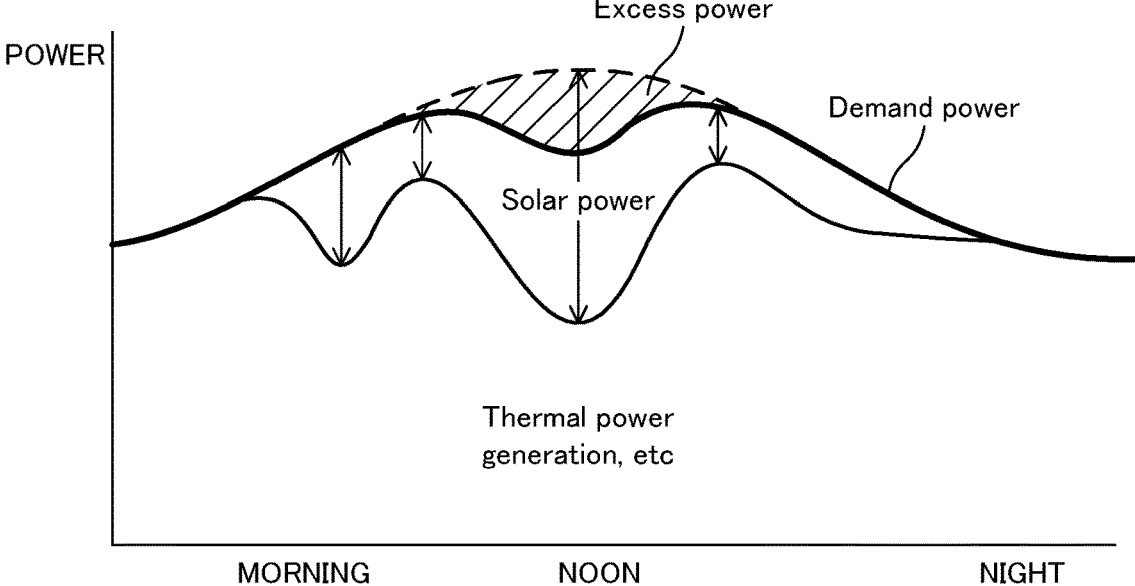
F I G . 4B
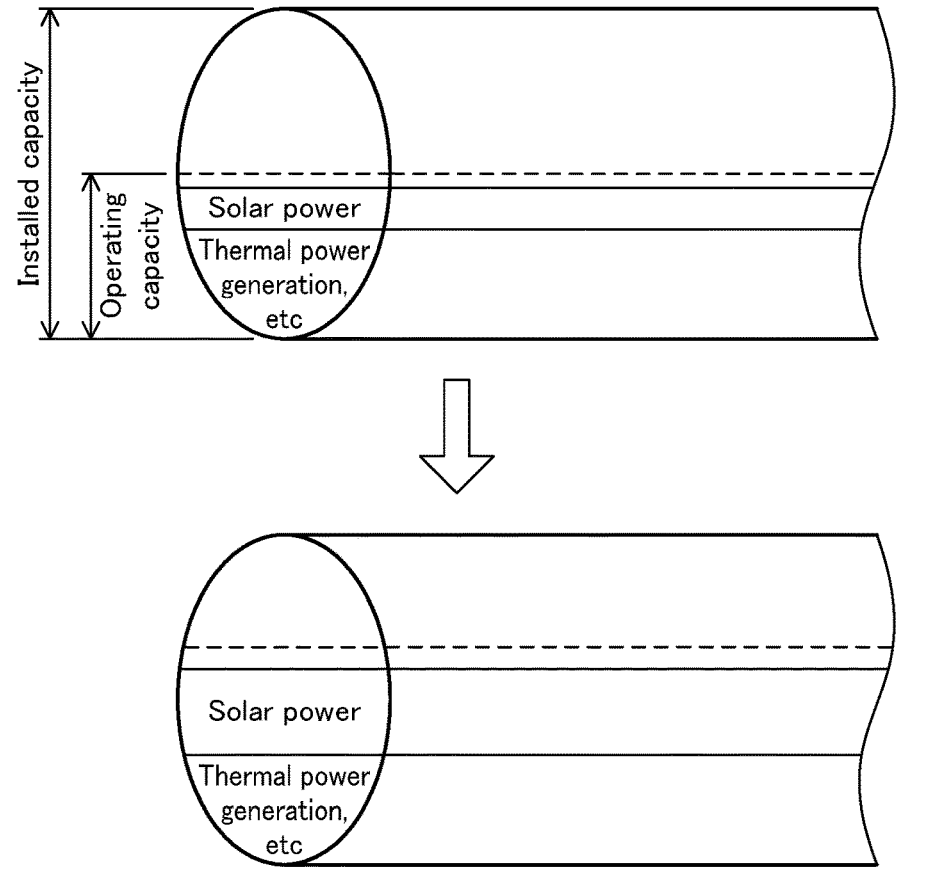

F I G . 5

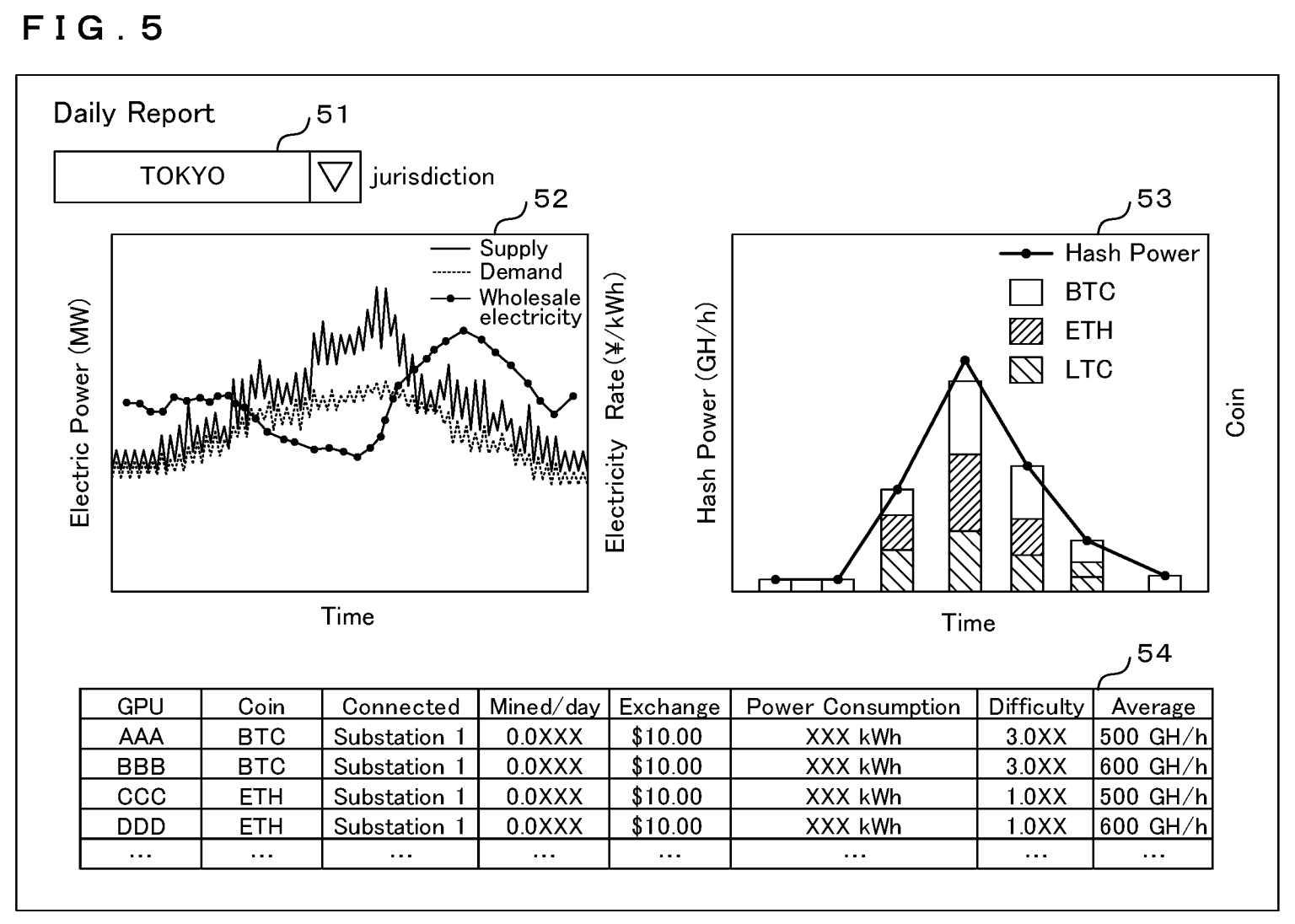

Daily Report

51    TOKYO   ▽   jurisdiction

52

Electric Power (MW)

Electricity Rate (¥/kWh)

— Supply
⋯ Demand
●— Wholesale electricity

Time

53

Hash Power (GH/h)

●— Hash Power
□ BTC
▨ ETH
▧ LTC

Coin

Time

54

| GPU | Coin | Connected | Mined/day | Exchange | Power Consumption | Difficulty | Average |
|-----|------|-----------|-----------|----------|-------------------|------------|---------|
| AAA | BTC | Substation 1 | 0.0XXX | $10.00 | XXX kWh | 3.0XX | 500 GH/h |
| BBB | BTC | Substation 1 | 0.0XXX | $10.00 | XXX kWh | 3.0XX | 600 GH/h |
| CCC | ETH | Substation 1 | 0.0XXX | $10.00 | XXX kWh | 1.0XX | 500 GH/h |
| DDD | ETH | Substation 1 | 0.0XXX | $10.00 | XXX kWh | 1.0XX | 600 GH/h |
| … | … | … | … | … | … | … | … |

F I G . 6
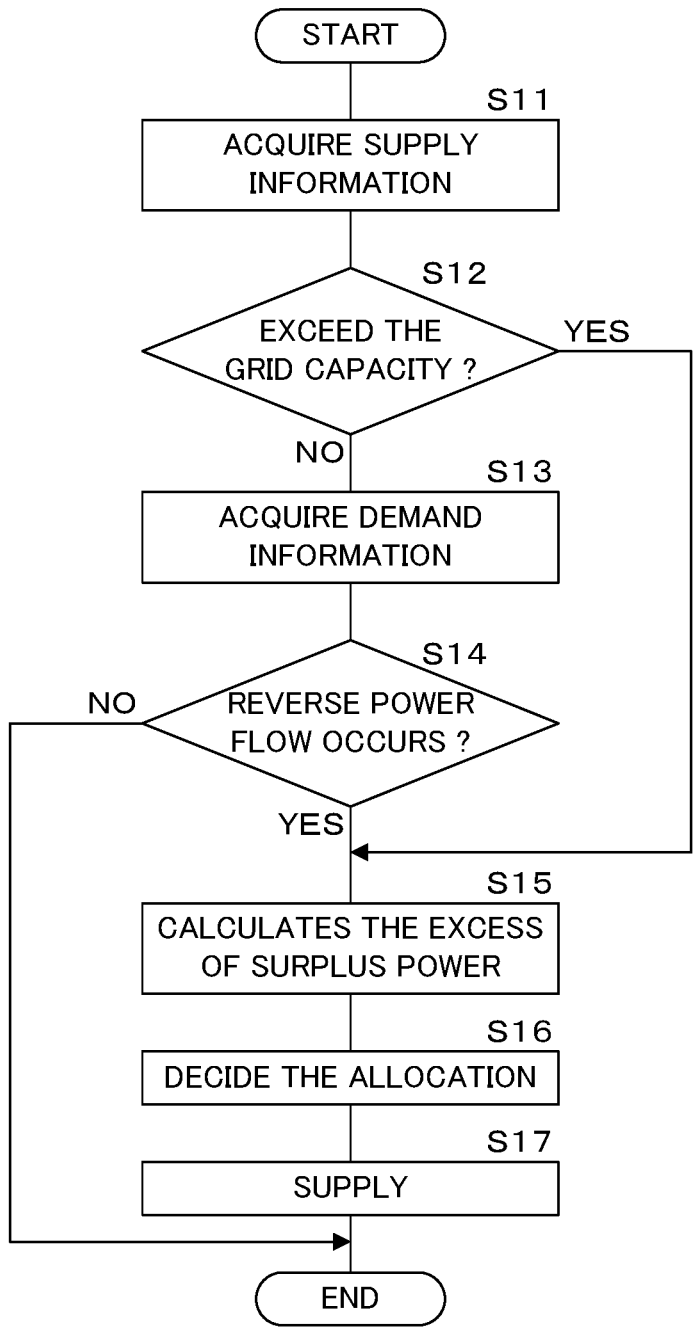

F I G . 7
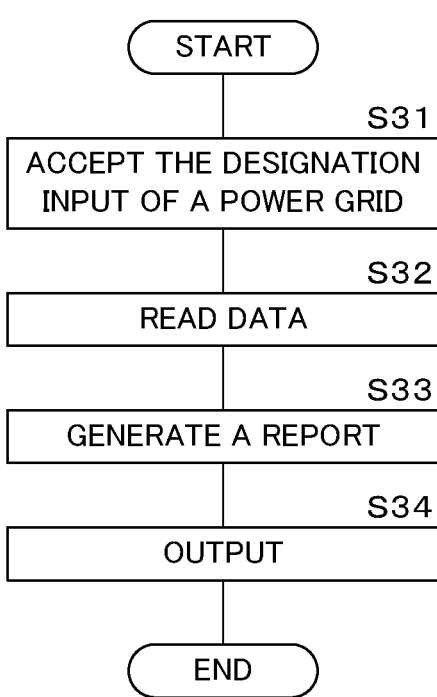

F I G . 8
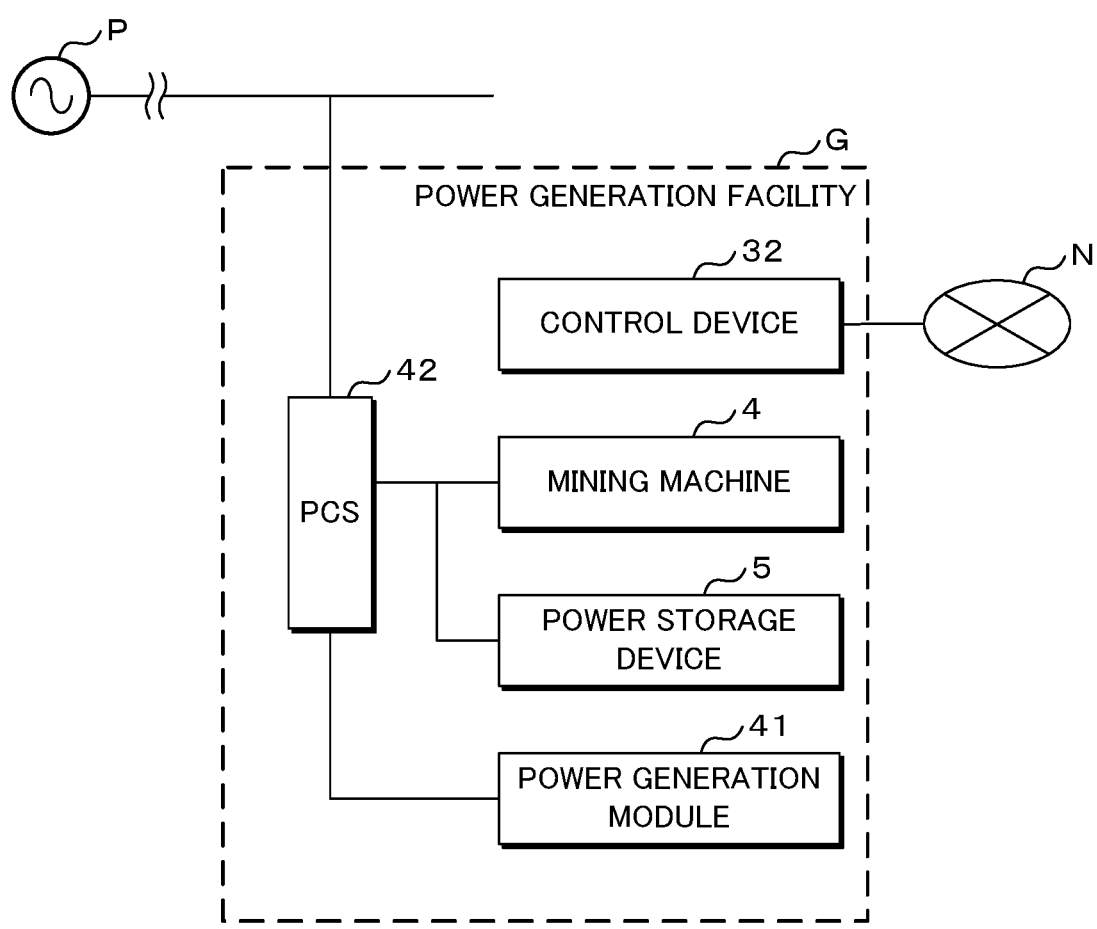

F I G . 9
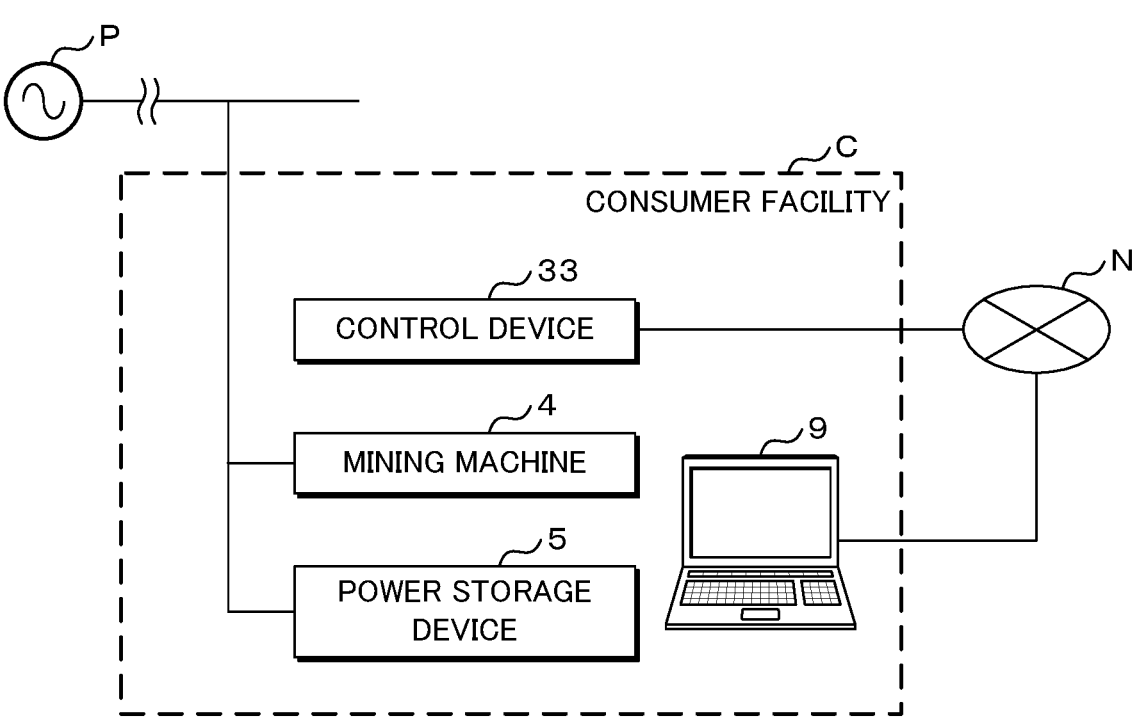

F I G . 10
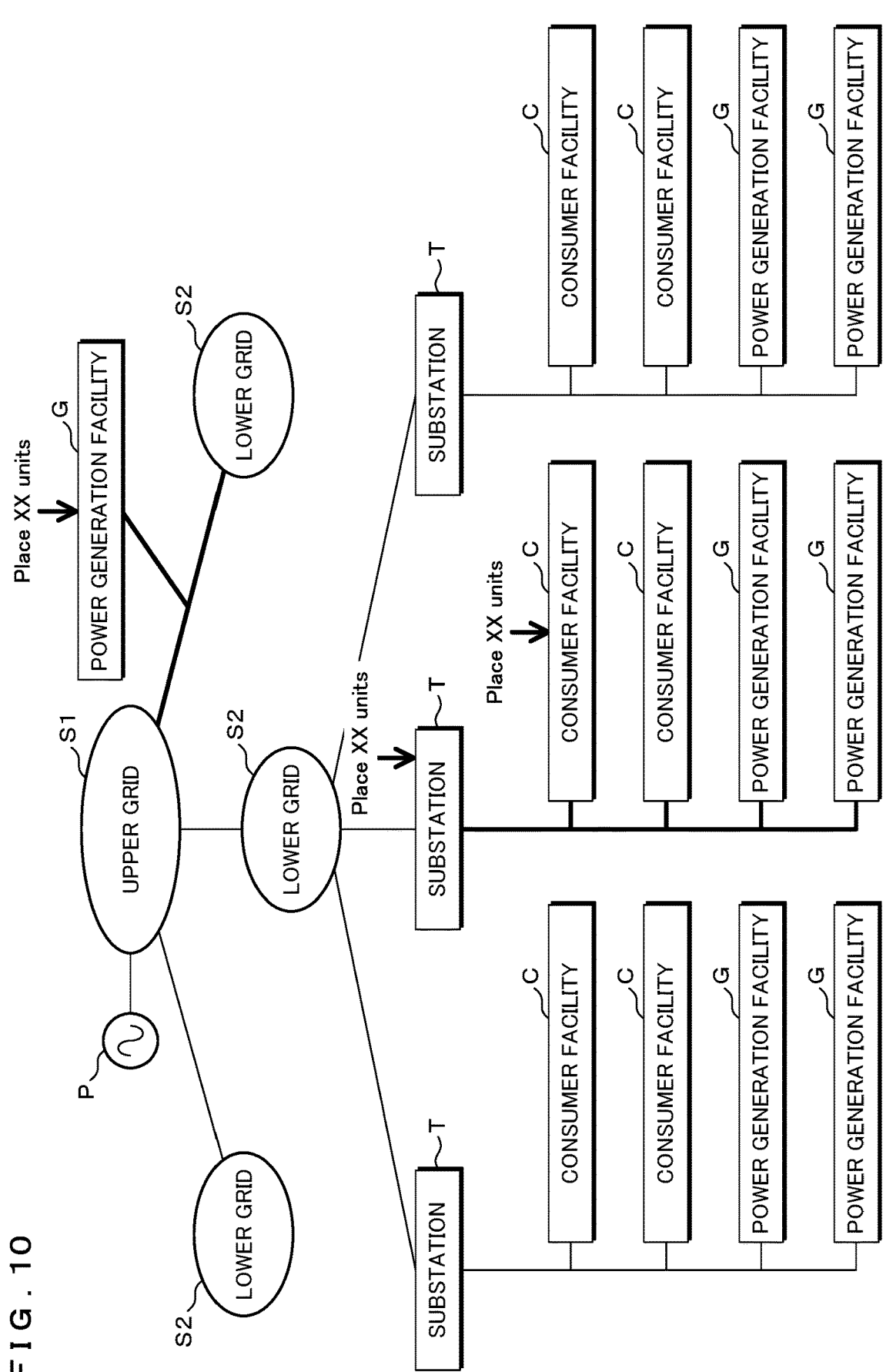

F I G . 11
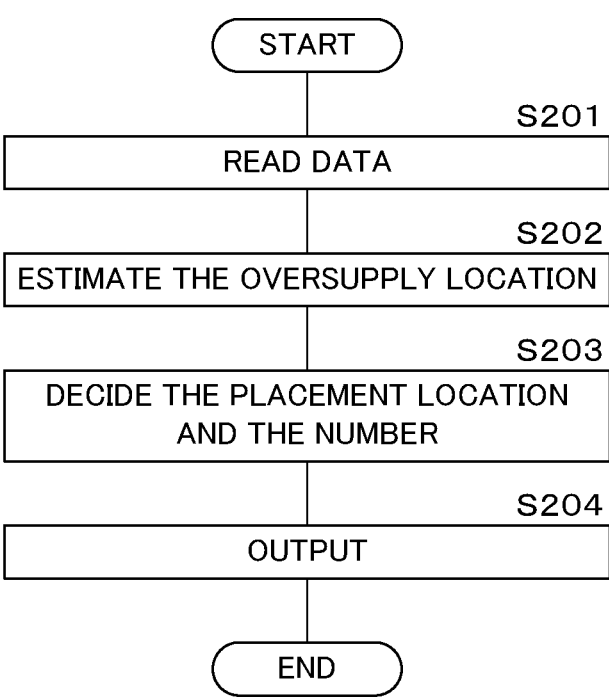

F I G . 1 2
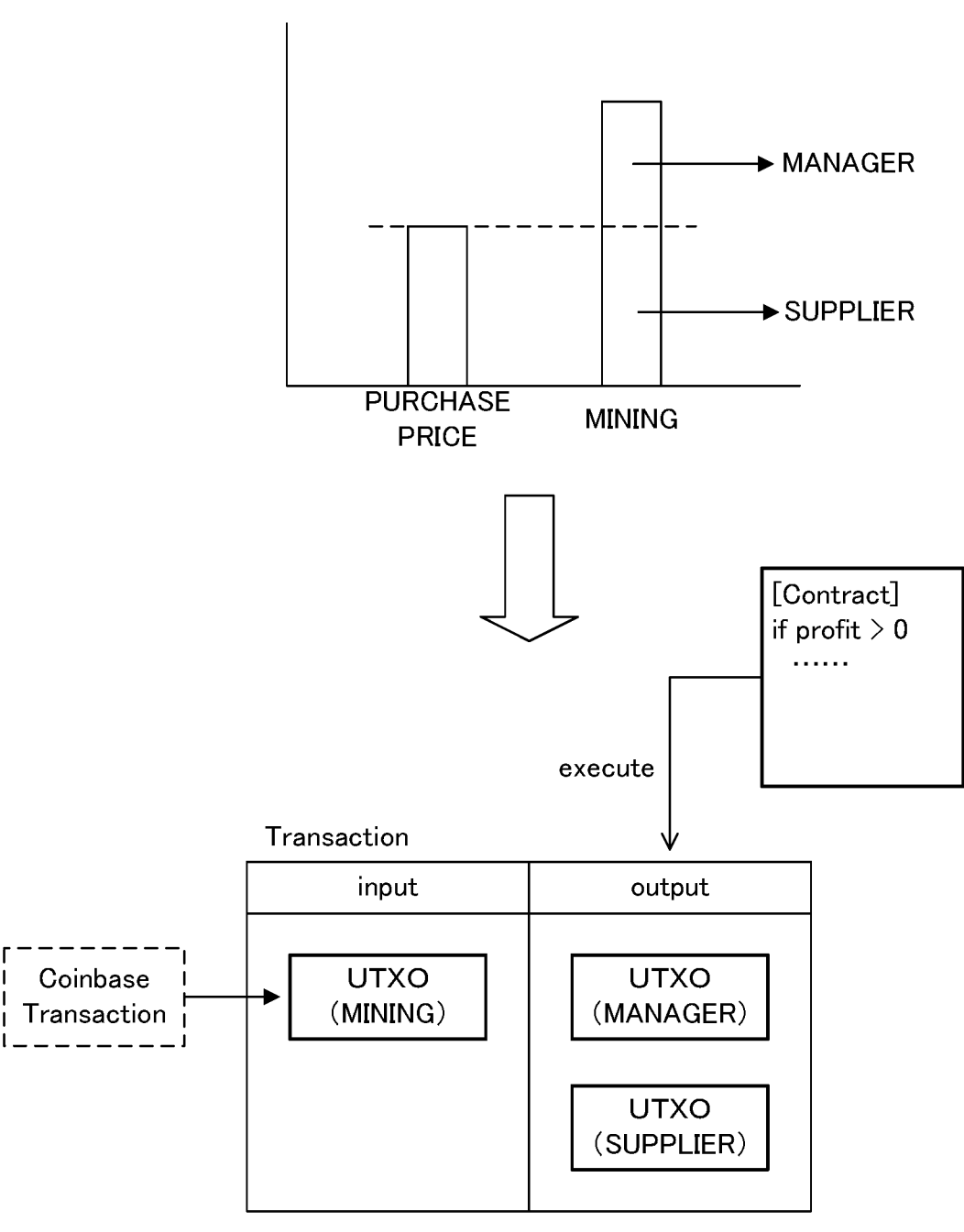

START

S301
CALCULATE THE PURCHASE PRICE

S302
GENERATE A SMART CONTRACT

S303
SUPPLY THE SURPLUS POWER

S304
GENERATE A TRANSACTION

END

F I G . 1 5
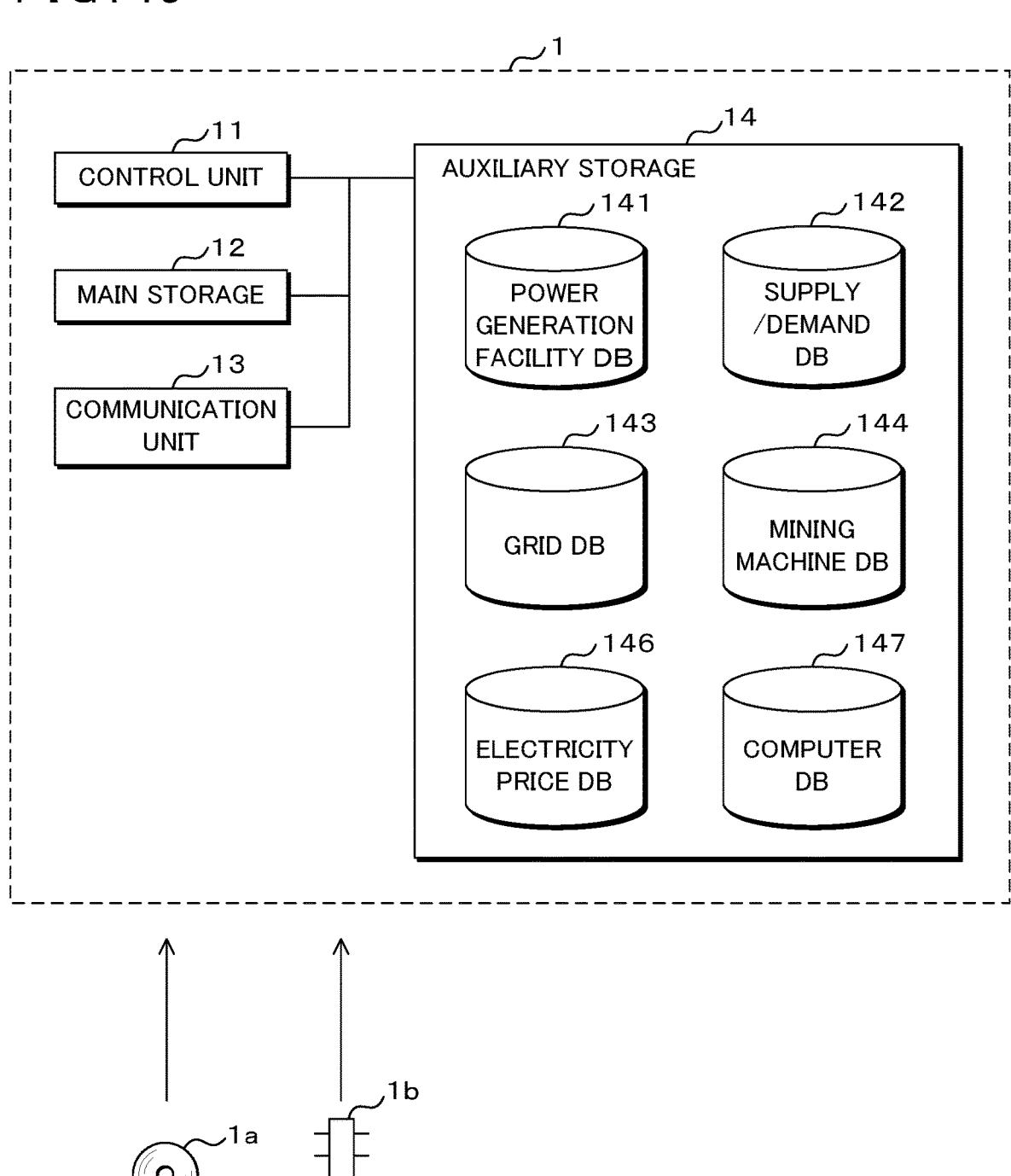

F I G . 16

| COMPUTER ID | CONNECTION | POWER CONSUMPTION | Task | | | | EXECUTION HISTORY | |
| | | | TASK NAME | EXECUTION DEADLINE | REWARD | DATE | RESULT OF THE COMPUTATION |
|---|---|---|---|---|---|---|---|
| 40001 | SUBSTATION 1 | XX W/h | Task XX | 2019/10/1 | 0.00XX Token | 2019/9/1 | XX % |
| ... | ... | ... | ... | ... | ... | ... | ... |

F I G . 17
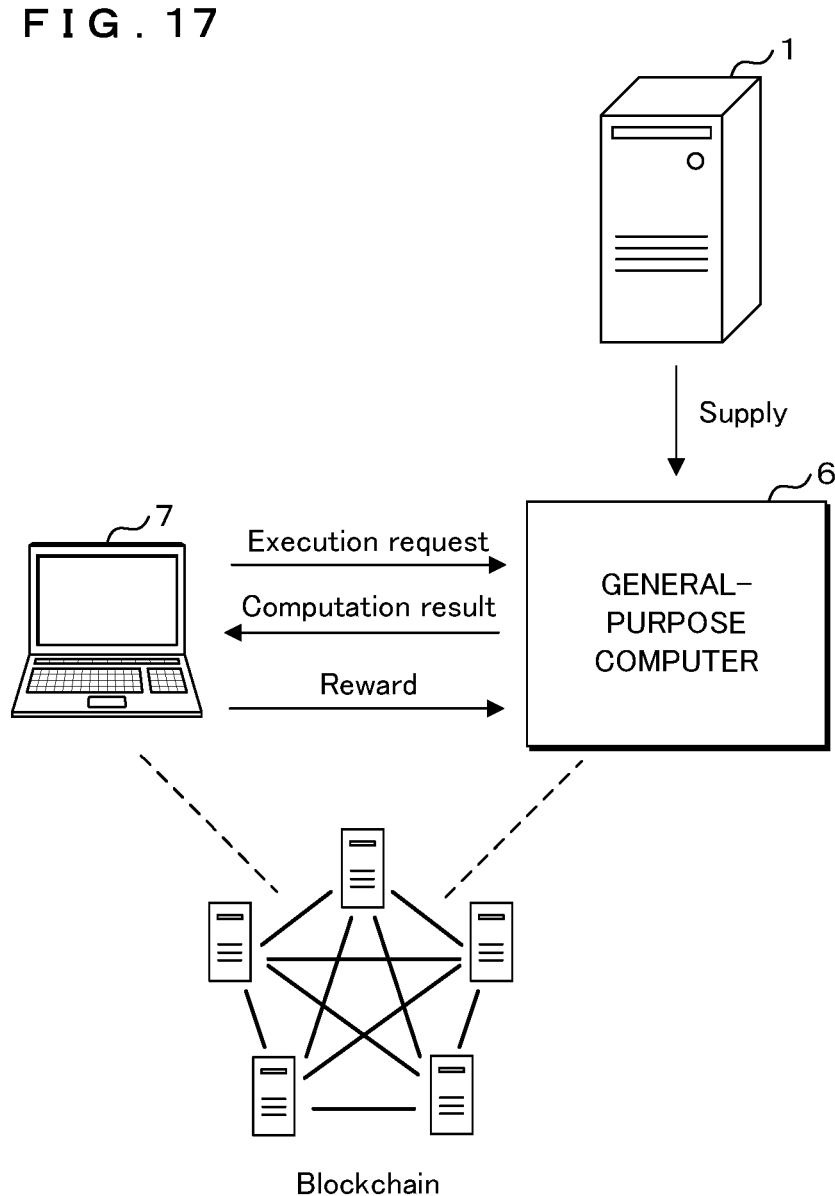
Supply
Execution request
Computation result
Reward
GENERAL-
PURPOSE
COMPUTER
Blockchain F I G . 18
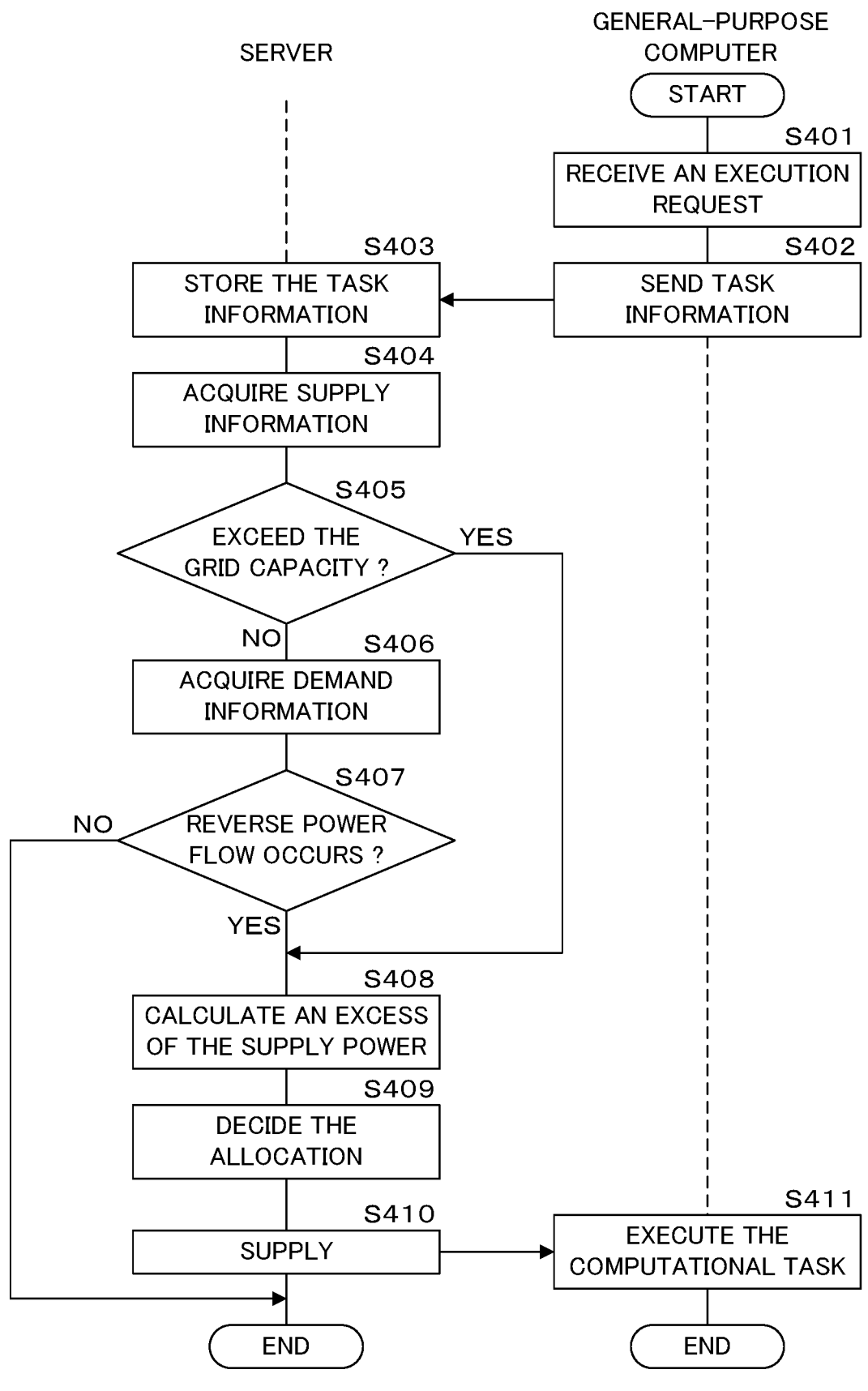

F I G . 19
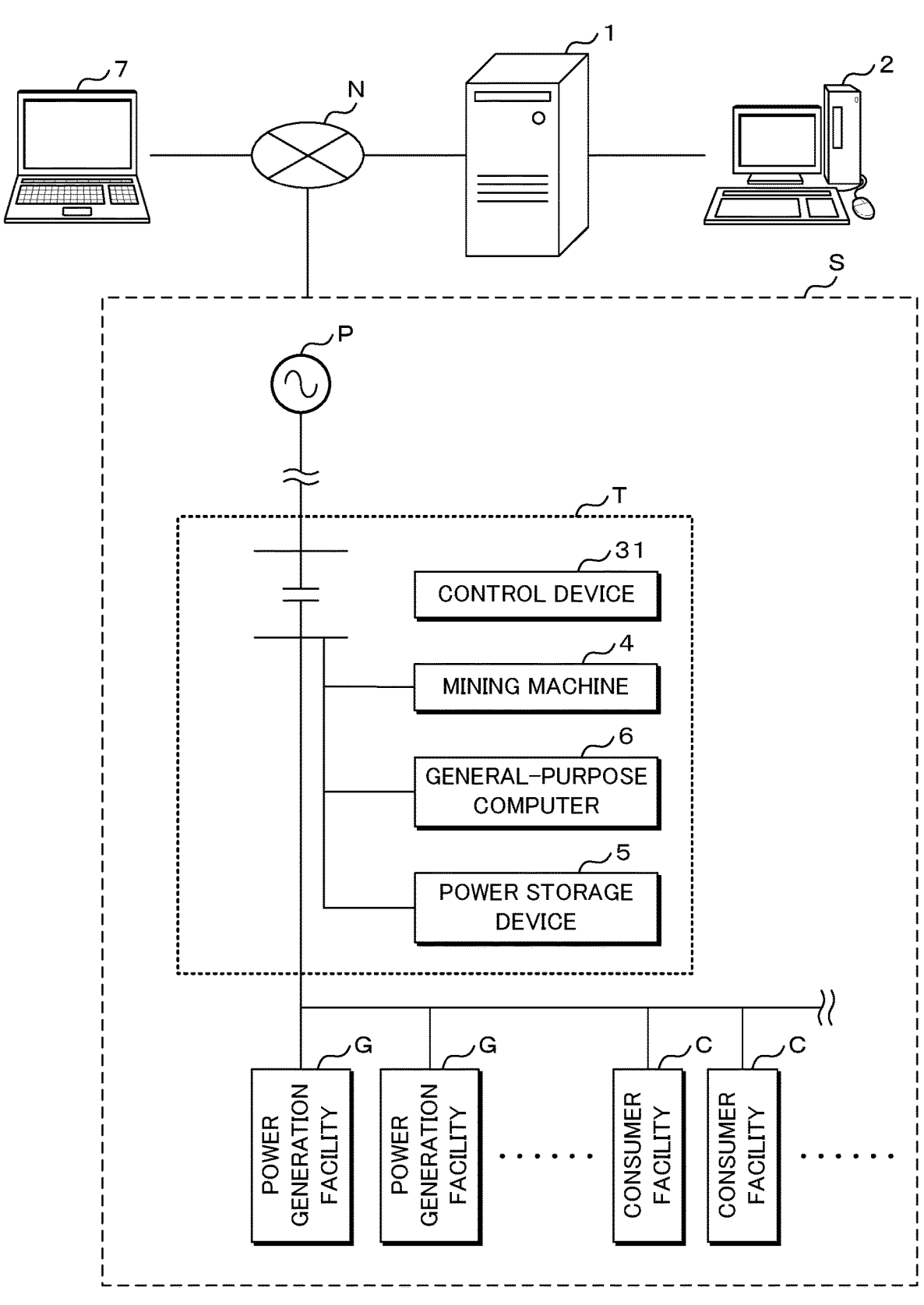

F I G . 20
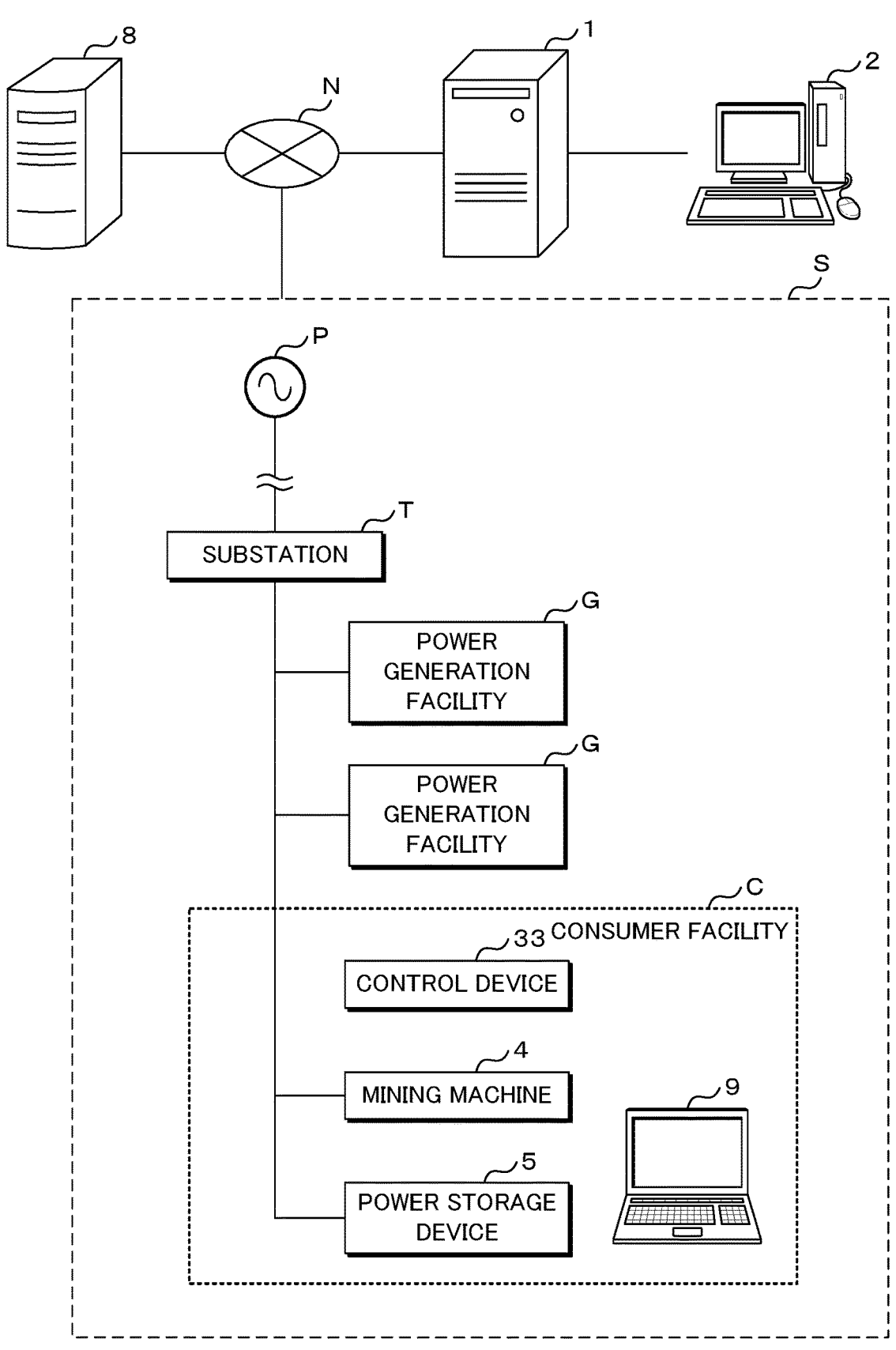

F I G . 21
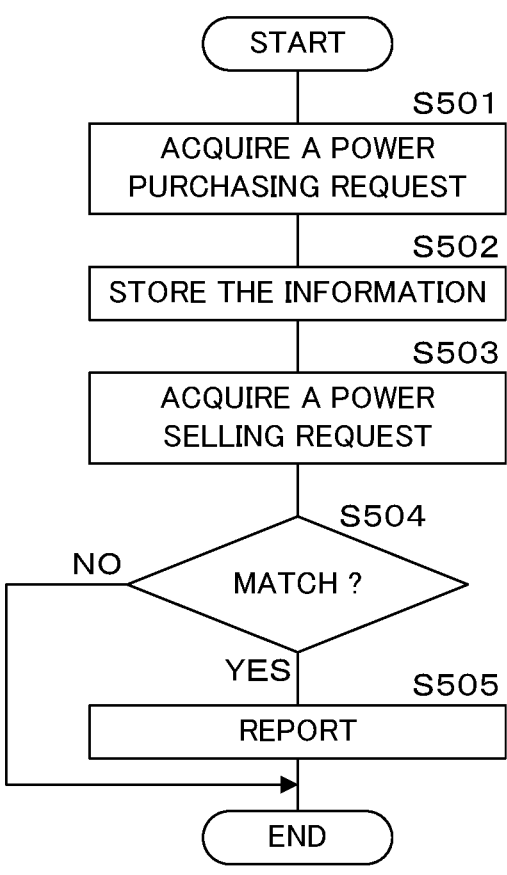

CONTROL METHOD, MANAGEMENT DEVICE, NON-TRANSITORY COMPUTER READABLE STORAGE MEDIUM AND POWER SYSTEM FOR DISTRIBUTING SURPLUS POWER

CROSS-REFERENCE TO RELATED APPLICATIONS

This application is the national phase under 35 U. S. C. § 371 of PCT International Application No. PCT/JP2020/043395 which has an International filing date of Nov. 20, 2020 and designated the United States of America.

FIELD

The present invention relates to a control method, a management device, a non-transitory computer-readable storage medium and a power system.

BACKGROUND ART

In recent years, with the spread of power generation facilities using renewable energy, overload in power grids presents a problem. For example, if a large number of power generation facilities using renewable energy are interconnected to a power grid, the suppression of output and expansion of the power grid are needed, which creates problems of increasing the cost borne by the consumers, inevitably placing the renewable energy interconnection in a standby condition until the expansion work is completed.

To address the problems described above, a system of stabilizing the transmission and distribution of power has been proposed. For example, Japanese Patent No. 6522820 discloses a computer system or the like that causes the computer on a power consumer side to activate to consume supply power in the case where a demand response (up DR) for encouraging power consumption is reported from a power supply side.

SUMMARY

Though the invention described in Japanese Patent No. 6522820, however, states that electricity is consumed on the consumer side in response to a demand response from the power supply side, it fails to specifically state when to consume power.

One aspect is to provide a control method that can optimally use surplus power.

In one aspect, a control method for causing a computer to execute processing of: acquiring supply information indicating supply power supplied to a power grid and grid information indicating a grid capacity of the power grid; determining whether or not the supply power exceeds the grid capacity based on the supply information and the grid information; and if it is determined that the grid capacity is exceeded, performing control so that surplus power exceeding the grid capacity is supplied to a computing device constituting a predetermined distributed computing system.

In one aspect, surplus power can optimally be used.

The above and further objects and features will more fully be apparent from the following detailed description with accompanying drawings.

BRIEF DESCRIPTION OF THE DRAWINGS

FIG. 3 illustrates one example of a record layout of a power generation facility DB, a supply/demand DB, a grid DB, a mining machine DB, a power storage device DB and an electricity price DB.

FIG. 4A illustrates the outline of a first embodiment.

FIG. 4B illustrates the outline of the first embodiment.

FIG. 5 illustrates one example of a report screen displayed a terminal.

FIG. 6 is a flowchart illustrating one example of the procedure of power supply control processing.

FIG. 7 is a flowchart illustrating one example of the procedure of report display processing.

FIG. 8 is a schematic diagram illustrating an example of the configuration of a power generation facility according to a modified example 1.

FIG. 9 is a schematic diagram illustrating an example of the configuration of a consumer facility according to a modified example 2.

FIG. 10 illustrates the outline according to a second embodiment.

FIG. 11 is a flowchart illustrating one example of a processing procedure executed by a server according to the second embodiment.

FIG. 12 illustrates the outline of a third embodiment.

FIG. 15 is a block diagram illustrating one example of the configuration of a server according to the fourth embodiment.

FIG. 16 illustrates one example of a record layout of a computer DB.

FIG. 17 illustrates the outline of the fourth embodiment.

FIG. 18 is a flowchart illustrating one example of the processing procedure executed by a power system according to the fourth embodiment.

FIG. 19 is a schematic diagram illustrating one example of the configuration of a power system according to a modified example 3.

FIG. 20 is a schematic diagram illustrating one example of a power system according to a fifth embodiment.

FIG. 21 is a flowchart illustrating one example of a processing procedure executed by an intermediate server.

DETAILED DESCRIPTION

The present disclosure will be described below with reference to the drawings depicting embodiments thereof.

First Embodiment

Figure 1:
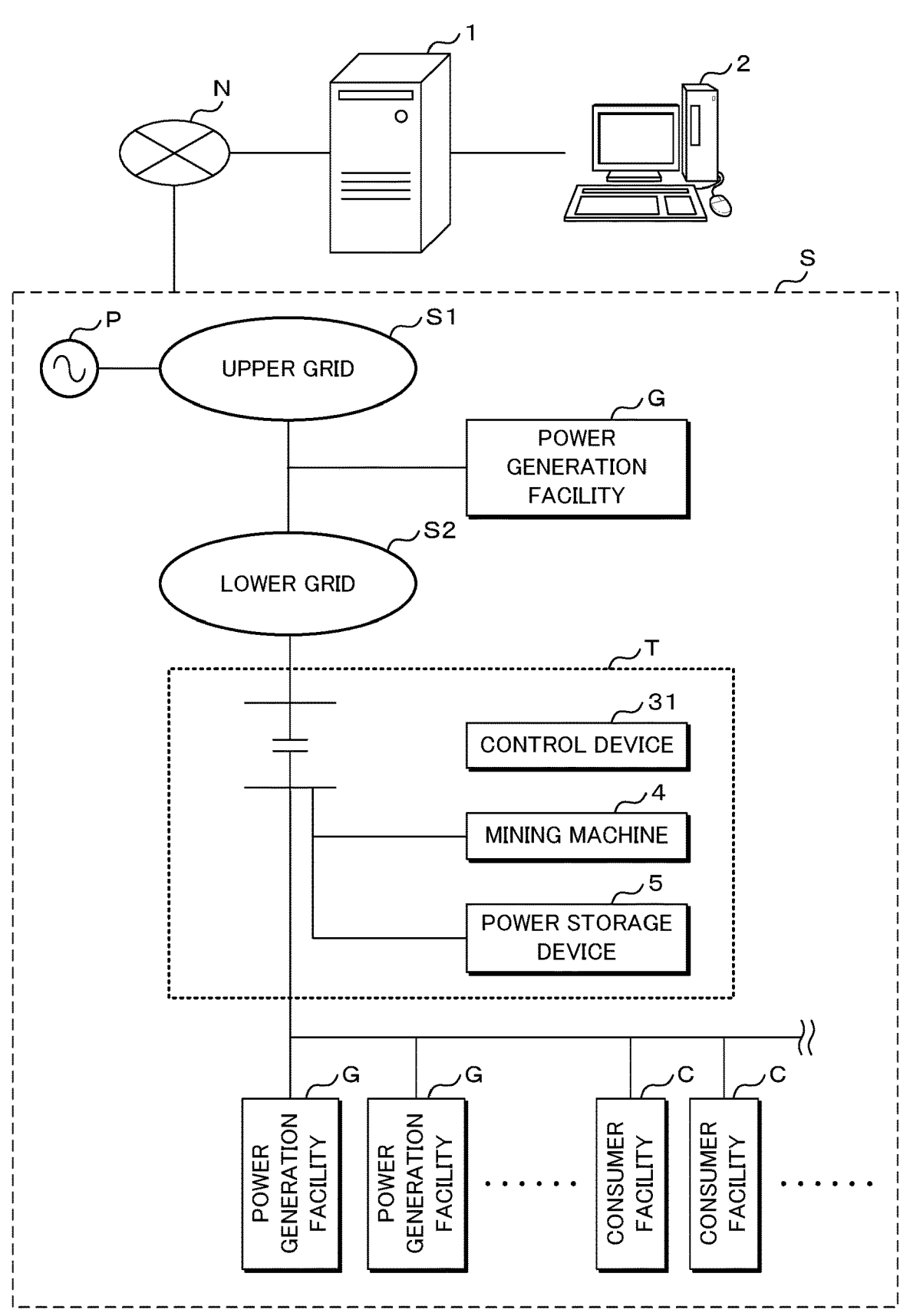
FIG. 1 is a schematic diagram illustrating an example of the configuration of a power system.

FIG. 1 is a schematic diagram illustrating an example of the configuration of a power system. In the present embodiment, a power system is described in which surplus power supplied from a power generation facility G, which is interconnected to a grid S as a commercial power grid and generates power using renewable energy, is supplied to mining machines 4 (first computing device) that mine cryptocurrency (first cryptocurrency). The power system includes a management device 1, a terminal 2, a control device 31, a mining machine 4 and a power storage device

3

5. The management device 1 is configured to be able to communicate with various devices that constitute the grid S through a network N.

The management device 1 is an information processing device that performs various information processing and transmission and reception of information, and corresponds to, for example, a server computer, a personal computer or the like. In the present embodiment, the management device 1 is referred to as a server 1 for brevity below regarding it as a server computer. The server 1 is a server computer of a power transmission and distribution business operator (power company) that manages the grid S and functions as a central control unit that controls the transmission and distribution of power in the grid S including an upper grid (bulk power grid) 51 in a wide area down to a lower grid S2 in each area (i.e., each prefecture).

The terminal 2 is a terminal device operated by the manager (electric power company) of the present system and corresponds to a personal computer or the like that functions as a client terminal for the server 1.

The grid S includes a substation T, a power generation facility G, a consumer facility C and a power source P. The substation T is a substation facility provided with transformers or the like and corresponds to a distribution substation, for example. Note that the substation T may be an ultra-high voltage substation, a primary substation, a secondary substation (intermediate substation) or the like. The substation T steps down power transmitted from the power source P through the upper grid 51 and the lower grid S2, and supplies the power to the consumer facility C. As illustrated in FIG. 1, the substation T is configured to be able to receive power transmitted from the power generation facility G.

The power generation facility G is a power generation facility that generates power using renewable energy or the like and corresponds to a photovoltaic power generation facility, for example. Note that any power generation method may be employed for the power generation facility G including a wind power plant, a hydroelectric power plant, a geothermal power plant and the like as long as it uses renewable energy. The power generation facility G may be, for example, small-scale equipment installed by small-lot consumers for self-generation or large-scale equipment installed by a predetermined power generation company for selling electricity. The power generation facility G is connected to the grid S so that the electricity generated by its own facility can be supplied to the grid S, and sells the electricity to the electric power company.

It should be noted that the location where the power generation facility G is connected (interconnected) is not limited to a particular site. As illustrated in FIG. 1, the power generation facility G may be connected to the transmission and distribution network of the lower grid S2, or connected to the transmission and distribution network between the upper grid 51 and the lower grid S2.

The mining machines 4 correspond to computers (nodes) that constitute a blockchain network, which is a distributed computing system, and that participate in the network as miners. The mining machines 4 are each equipped with a high-speed computing processor such as an Application specific Integrated Circuit (ASIC) and perform computations related to the mining of cryptocurrency such as Bitcoin (registered trademark) and Ethereum (registered trademark). The cryptocurrency is crypto-assets whose transaction histories are recorded in a distributed ledger called a block-chain. The cryptocurrency is digital data on transaction histories that are recorded in a tamper-resistant manner by each node (miner) distributed on the network N verifying the transaction details. The cryptocurrency that the mining machine 4 mines is not limited to a particular type. Though only one mining machine 4 is illustrated in FIG. 1 for convenience, multiple mining machines 4, 4, 4 . . . are connected in practice.

In the substation T, for example, a large number of mining machines 4, which are housed in a container, are placed. Though the mining machine 4 is connected to the low-voltage side of the substation T in FIG. 1, it may be connected to the high-voltage side.

In addition, the power storage device 5 is placed in the substation T alongside the mining machine 4. Though only one power storage device 5 is illustrated in FIG. 1, multiple power storage devices 5, 5, 5 . . . are connected in practice. As in the mining machine 4, the power storage devices 5, which are housed in a container, are also placed in the substation T.

The control device 31 is a controller that controls power supply to the mining machines 4 and the power storage devices 5.

The server 1 transmits control information for controlling the control device 31 through the network N and remotely controls the power supply to the mining machines 4 and the power storage devices 5.

In the present embodiment, though the mining machines 4 and the power storage devices 5 are described as being located in the substation T, they may be located in the power generation facility G that generates power from renewable energy or the consumer facility C as described in modified examples 1 and 2 below, not limited to the substation T.

In the present embodiment, the server 1 determines whether or not power supplied from various power sources including the power generation facility G exceeds a predetermined output suppression value indicating the upper limit that allows power transmission and distribution. Specifically, as described below, the server 1 determines whether or not the power supplied to the grid S exceeds the grid capacity of the grid S and/or whether or not a reverse power flow occurs in the grid S. If determining that the grid capacity is exceeded or determining that a reverse power flow occurs, the server 1 performs control so that the excess of surplus power is supplied to the mining machines 4. In other words, the server 1 creates demand from the mining machines 4 to eliminate the oversupply situation. Specifically, as described below, the server 1 controls the power supply to the mining machines 4 and/or the power storage devices 5 via the control device 31 installed in the substation T to cause these devices to perform mining and/or storage.

Though the server 1 (management device) on the cloud is assumed to remotely control the local control device 31 in the present embodiment, the control device 31 may predominantly perform a series of processing of determination, supply control and so on. Furthermore, not a single device (central control unit) may predominantly perform processing, but multiple devices may distributively perform a series of processing in conjunction with one another.

Though the server 1 is described as supplying surplus power to the power storage devices 5 (storage battery) for storing power in the present embodiment, the server 1 may supply surplus power to fuel cells, a Compressed Air Energy Storage (CAES) system, a molten salt heat storage or the like. That is, the server 1 does not necessarily supply surplus power to the power storage device 5 as long as it can supply surplus power to a predetermined energy storage device.

In the present embodiment, the destination of surplus power other than the mining machine 4 includes, but not limited to, the energy storage device. For example, surplus power may be supplied to an alkaline water electrolysis device. The alkaline water electrolysis device produces hydrogen and supplies the produced hydrogen to fuel cells or the like. This can also optimally consume surplus power.

In addition, in the present embodiment, the destination to which the power generation facility G sells power is described as the power transmission and distribution business operator (electric power company), but may be, for example, a power retailer, a consumer, and individuals connected by peer-to-peer (P2P), not limited to the power transmission and distribution business operator. In addition, the manager of the present system may be a virtual power plant (VPP) operator, a renewable energy power generation business operator and the like other than the power transmission and distribution business operator. That is, the manager needs not be a power transmission and distribution business operator and may be different from the power selling destination.

Figure 2:
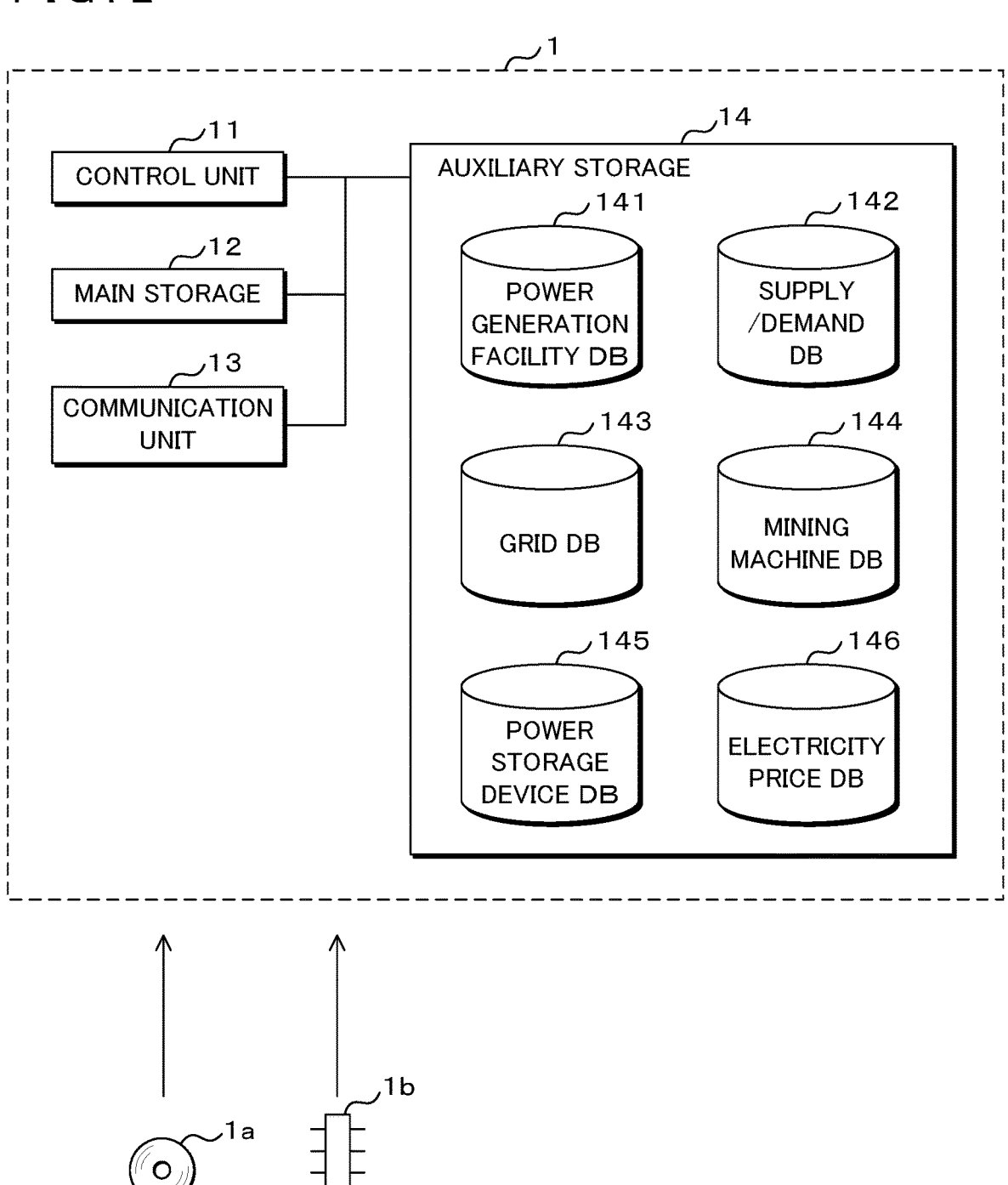
FIG. 2 is a schematic diagram illustrating an example of the configuration of a server.

FIG. 2 is a schematic diagram illustrating an example of the configuration of the server 1. The server 1 has a control unit 11, a main storage 12, a communication unit 13 and an auxiliary storage 14.

The control unit 11 has an arithmetic processing unit including one or more Central Processing Units (CPUs), Micro-Processing Units (MPUs), Graphics Processing Units (GPUs) and the like and performs various information processing and control processing by reading and executing programs stored in the auxiliary storage 14. The main storage 12 is a temporary storage area such as a Static Random Access Memory (SRAM), a Dynamic Random Access Memory (DRAM) and flash memory, and temporarily stores data necessary for the control unit 11 to execute arithmetic processing. The communication unit 13 is a communication module for performing processing related to communication, and transmits and receives information to/from the outside.

The auxiliary storage 14 is a non-volatile storage area such as a hard disk and a large-capacity memory, and stores programs necessary for the control unit 11 to execute processing and other data. Furthermore, the auxiliary storage 14 stores a power generation facility DB 141, a supply/demand DB 142, a grid DB 143, a mining machine DB 144, a power storage device DB 145 and an electricity price DB 146. The power generation facility DB 141 is a database that stores information on each power generation facility G. The supply/demand DB 142 is a database that stores power demand information and power supply information. The grid DB 143 is a database that stores grid information on the grid S. The mining machine DB 144 is a database that stores information on each mining machine 4. The power storage device DB 145 is a database that stores information on each power storage device 5. The electricity price DB 146 is a database that stores data on electricity prices on the electricity transaction market (i.e., wholesale electricity prices on the Japan Electric Power Exchange).

Note that the auxiliary storage 14 may be an external storage connected to the server 1. Furthermore, the server 1 may be a multi-computer consisting of multiple computers, or may be a virtual machine built by software in phantom.

In the present embodiment, the server 1 is not limited to the above-mentioned configuration and may include an input unit that accepts operation input and a display unit that displays an image, for example. Furthermore, the server 1 may also have a reader that reads a portable storage medium 1a such as CD (Compact Disk)-ROM and DVD (Digital Versatile Disc)-ROM, and read programs from the portable storage medium 1a and execute the programs. Alternatively, the server 1 may read programs from a semiconductor memory 1b.

FIG. 3 illustrates an example of the record layout of the power generation facility DB 141, the supply/demand DB 142, the grid DB 143, the mining machine DB 144, the power storage device DB 145 and the electricity price DB 146.

The power generation facility DB 141 includes a power generation facility ID column, a type column, a connection column, and a power generation amount column. The power generation facility ID column stores the power generation IDs to identify each power generation facility G. The type column, connection column and power generation amount column respectively store the type of each power generation facility G (generation method), the location where each power generation facility G is connected (interconnected) in the grid S and the amount of power generated by each power generation facility G in associated with the IDs of the power generation facility.

The supply/demand DB 142 includes a power grid column, a date and time column, a demand value column and a supply value column. The power grid column stores the grid names of the power grids that are classified by regions for the grid S. The date and time column, demand value column and supply value column respectively store a date and time, the power demand value and the power supply value on this date and time in association with each grid name.

The grid DB 143 includes a power grid column, a transmission line/substation column, an operating capacity column and an available capacity column. The power grid column stores grid names of the power grids classified by regions for the grid S. The transmission line/substation column, operating capacity column and available capacity column respectively store transmission lines or substations T constituting the power grid, the operating capacities and available capacities of the transmission lines or the substations T in association with each grid name.

The mining machine DB 144 includes a machine ID column, a connection column, a power consumption column, a computation column and a mining column. The machine ID column stores the machine IDs to identify each of the mining machines 4. The connection column, power consumption column, computation column and mining column respectively store the connection (placement) locations of the mining machines 4 in the grid S, the power consumptions per unit time of the mining machine 4, the computation amounts per unit time and the execution histories of mining in association with each machine ID. The mining column stores the type of cryptocurrency mined and the amount of mining in association with the date and time when the mining is performed.

The power storage device DB 145 includes a power storage device ID column, a connection column, a rated capacity column and a remaining capacity column. The power storage device ID column stores power storage device IDs to identify each of the power storage devices 5. The connection column, rated capacity column and remaining capacity column respectively store the connection (placement) locations of the power storage devices 5 in the grid S, the rated capacity of the power storage devices 5 and the remaining capacity that is currently available for storage in association with each power storage device ID.

The electricity price DB 146 includes a time slot column and a price column. The time slot column stores the time slots during which transactions took place on the electricity transaction market. The price column stores the transaction prices of wholesale electricity in association with each time slot.

FIGS. 4A and 4B illustrate the outline of the first embodiment. FIG. 4A illustrates a graph showing the intraday variation of the power demand value and the power supply value. FIG. 4B illustrates a conceptual diagram related to a grid capacity. The outline of the present embodiment will be described with reference to FIGS. 4A and 4B.

In FIG. 4A, the power generation facility G is assumed to perform solar power generation as one example. The solar power generation is naturally conducted during the daytime, which increases the power supply during the daytime. If a large number of power generation facilities G, G, G . . . are connected to the grid S, an excessive supply of power from the power generation facilities G during the day may cause a reverse power flow in the grid S. In order to address this problem, the power transmission and distribution business operator controls the amount of power generated at a thermal power plant or the like so that the supply power is balanced with the demand power. However, if there is an imbalance even after the supply restrictions imposed by the power transmission and distribution business operator side, it is necessary to request each power generation facility G to curb the output, which is a problem.

In addition, as illustrated in FIG. 4B, such a problem appears that the power grid S has a shortage in the grid capacity enough to transmit and distribute power, which hinders interconnection of the grid S to a new power generation facility. The rated capacity allowing transmission is specified for the transmission lines that constitute the grid S or the transmission and distribution facilities such as the substation T. In Japan, for example, it is stipulated that power transmission is to be carried out within half of the rated capacity. However, interconnection of a large number of power generation facilities G, G, G . . . causes a shortage of the grid capacity, so that new entrants may not be able to interconnect to the grid S in some regions.

Hence, in the present embodiment, the excess of surplus power is supplied to the mining machine 4 in order to address the problem with the reverse power flow or the grid capacity as described above. Specifically, as described below, surplus power is supplied to the mining machine 4 so as to be consumed therein while using the power storage device 5 as well.

For example, the server 1 continuously acquires, from watt meters (not illustrated) installed at the locations of the power source P, the transmission line, the substation T and the consumer facility C that constitute the grid S, supply information indicating supply power and demand information indicating demand power at the respective locations in the grid S over a network N and store them in the supply/demand DB 142. In addition, the server 1 continuously acquires power supply information from the power generation facility 4 for renewable energy as well over the network N and stores it in the power generation facility DB 141.

The server 1 determines whether or not supply power exceeds demand power, that is, whether or not a reverse power flow occurs with reference to the supply information and demand information stored in the supply/demand DB 142. For example, the server 1 predicts the intraday variation of each parameter from the actual values of the past power supply and power demand in the grid S, and estimates the oversupply location where the supply power exceeds the demand power and the time slot when the supply power exceeds the demand power. Note that in the case of prediction of the intraday variation of the supply power and the demand power, the server 1 may predict the parameters with reference to weather information (temperature, weather, etc.) as well. It is enough for the server 1 to be able to determine whether or not a reverse power flow occurs. The server 1 may determine whether or not a reverse power flow occurs from the detection result of a protective device for preventing a reverse power flow at any location of the grid S (i.e., substation T).

Moreover, the server 1 determines whether or not supply power exceeds the grid capacity for the grid S with reference to the supply information stored in the supply/demand DB 142 and the grid capacity stored in the grid DB 143. For example, the server 1 predicts the intraday variation of the supply power from the past supply information, compares the grid capacity at each location such as transmission lines and the substations T that constitute the grid S and the prediction value of supply power, and estimates the location where and the time slot when the supply power exceeds the grid capacity. In this case also, the intraday variation of the supply power may be predicted with reference to weather information or the like, as in the description above.

As described above, the server 1 determines whether or not a reverse power flow occurs in the grid S, or whether or not supply power exceeds the grid capacity. Note that the server 1 may perform only one of the two determinations. If determining that a reverse power flow occurs, or if determining that the grid capacity is exceeded, the server 1 supplies power to the mining machine so that the excess amount of surplus power (the difference between the supply power and the demand power or the grid capacity) is consumed.

For example, the server 1 identifies any of the mining machines 4, 4, 4 placed in the substation T corresponding to the oversupply location with reference to the mining machine DB 144. The server 1 decides allocation of the amount of power supplied to each mining machine 4 so that the above-described surplus power is consumed at multiple mining machines 4, 4, 4 with reference to the power consumption value of each mining machine 4.

In the present embodiment, not only the mining machines 4 but also the power storage devices 5 are used in combination so that surplus power is distributively supplied to the mining machines 4 and the power storage devices 5. The method of distributing surplus power is not limited to any particular method. For example, the server 1 performs allocation by preferentially supplying surplus power to the mining machines 4, 4, 4, . . . , and further supplying the surplus power to the power storage devices 5, 5, 5 . . . if the surplus power cannot be consumed even after supply to all the mining machines 4 placed in the substation T.

Note that the above-mentioned supply (allocation) method is one example, and surplus power may preferentially be supplied to the power storage devices 5, for example. For example, the server 1 may calculate an expected value of earnings from mining with reference to market value information indicating the current market value of the cryptocurrency (transaction price per unit volume at cryptocurrency exchange and the like) or difficulty of mining, and may decide the supply/allocation of surplus power.

In addition, the server 1 may decide the supply/allocation of surplus power based on the electricity price in addition to the market price information of the cryptocurrency and the difficulty of mining. For example, the server 1 stores the wholesale electricity price for each time slot in the electricity transaction market in the electricity price DB 146. Referring to the wholesale electricity prices, the server 1 predicts the price of the electricity stored in the power storage device 5 at the time of discharge and decides the supply/allocation of surplus power. As described above, the server 1 may decide the supply/allocation of surplus power to the mining machines 4 and the power storage devices 5 based on the market value information of the cryptocurrency and the market value information of the electricity price.

As described above, the server 1 decides the allocation of the amount of power supply to the mining machines 4 and/or the power storage devices 5 and outputs control information to the control device 31 so that the surplus power is supplied to the mining machines 4 and/or the power storage devices 5 in the allocation. The mining machines 4 and the power storage devices 5 receive the supply of the surplus power to respectively perform computation processing related to the mining of cryptocurrency and power storage.

Note that the mining machine 4 preferably assigns data to certify that the cryptocurrency is mined based on non-fossil energy such as renewable energy or the like to the mined cryptocurrency. This data is data corresponding to the Non-Fossil Certificate in Japan. The Non-Fossil Certificate is verified by a global initiative "RE100" participated by a number of enterprises around the world, and a trading market for non-fossil certificates has been created in Japan.

The mining machine 4 may assign data corresponding to the non-fossil certificate to the mined cryptocurrency. Means for assigning data is not necessarily limited to a particular method. For example, the mining algorithm itself may be modified, or an authentication server that issues a non-fossil certificate may be added to the system as a trusted third party so that the authentication server may receive the hash value of the mined cryptocurrency from the mining machine 4 and send back the data corresponding to the non-fossil certificate. The mining machine 4 may add the data corresponding to the non-fossil certificate to the cryptocurrency transaction and broadcast it.

Though in the description above, data corresponding to the non-fossil certificate is assigned as data to be applied to the cryptocurrency, data similar to the non-fossil certificate such as a green power certificate (certificate that changes the environmental value acquired with renewable energy into a tradable certificate) may be assigned. That is, as long as the mining machine 4 is able to provide data that certifies the environmental value of the energy source of the surplus power, the data content is not limited to what is called a non-fossil certificate.

The server 1 successively acquires data on the mining execution history for each mining machine 4 and the storage history for each power storage device 5 via the control device 31 and stores them in the mining machine DB 144 and the power storage device DB 145. The server 1 continues to supply surplus power to the devices with reference to the execution history of the mining machines 4 and the storage history of the power storage devices 5 respectively stored in the mining machine DB 144 and the power storage device DB 145.

FIG. 5 illustrates one example of a report screen displayed on the terminal 2. FIG. 5 illustrates an example of a report screen representing the execution history of mining by the mining machine 4. For example, the server 1 outputs the execution history of mining in response to a request from the terminal 2 to cause the terminal 2 to display the screen illustrated in FIG. 5.

For example, the server 1 accepts a designation input of the power grid (upper grid 51 or lower grid S2) for which the mining result is to be displayed in response to an operation input to a region designation field 51. If the designation input of the power grid is accepted, the server 1 generates a report screen representing the execution history for each of the mining machines 4 connected to the designated power grid (i.e., the execution history of the previous day) and outputs it to the terminal 2.

For example, the report screen includes a supply/demand graph 52, a mining graph 53 and a list table 54. The supply/demand graph 52 is a graph showing the intraday variation of the demand and supply values of power in the designated power grid and the intraday variation of the wholesale electricity price. The mining graph 53 is a graph showing the intraday variations of the total sum of the computation for mining in the mining machines 4, 4, 4 . . . placed in the grid and the sum of the mining volume of the cryptocurrency. The list table 54 is a table presenting in a list form the data of the individual mining machines 4 (e.g., an execution history of mining, a connection location where each mining machine 4 is connected in the grid S and the like).

The server 1 generates the supply/demand graph 52 of the designated power grid with reference to the supply/demand DB 142 and the electricity price DB 146 as well as the mining graph 53 and the list table 54 with reference to the mining machine DB 144, and outputs them to the terminal 2. The terminal 2 displays a report screen presenting the supply/demand graph 52, the mining graph 53 and the list table 54, and contrastingly presents the electricity supply and demand histories, the transaction price history and the mining execution history to the manager. This allows the manager (power company) to easily grasp the execution history of mining in each region (power grid) and the relationship with the electricity supply and demand and the wholesale electricity prices.

FIG. 6 is a flowchart illustrating one example of the procedure of power supply control processing. The details of the power supply control processing executed by the server 1 will be described with reference to FIG. 6.

The control unit 11 of the server 1 acquires supply information indicating supply power that is supplied to the grid S and that comes from various power sources including the power supply from the power generation facility G using renewable energy (step S11). The control unit 11 determines whether or not the power supply exceeds the grid capacity of the grid S with reference to the grid DB 143 (step S12).

If determining that the grid capacity is not exceeded (S12: NO), the control unit 11 acquires demand information indicating the demand power consumed at each consumer facility C (step S13). The control unit 11 determines whether or not a reverse power flow occurs with reference to the supply information and the demand information (step S14). If determining that a reverse power flow does not occur (S14: NO), the control unit 11 terminates the series of processing.

If determining that the supply power exceeds the grid capacity (S12: YES), or if determining that a reverse power flow occurs (S14: YES), the control unit 11 calculates the excess of surplus power (step S15). The control unit 11 decides the allocation of the amount of power to be supplied to the mining machine 4 and/or the power storage device 5 (energy storage device) such that the surplus power is consumed (step S16). In this case, the control unit 11 may decide the allocation with reference to the market value information of the cryptocurrency and the market value information of the wholesale electricity price, for example. The control unit 11 controls the power supply via the control unit 31 so that the surplus power is supplied to the mining machine 4 and/or the power storage device 5 at the decided allocation (step S17). The control unit 11 ends the series of processing.

FIG. 7 is a flowchart illustrating one example of the procedure of report display processing. The contents of the processing performed when a report screen representing the execution history of mining is displayed on the terminal 2 will be described with reference to FIG. 7.

The control unit 11 of the server 1 accepts the designation input of a power grid (upper grid 51 or lower grid S2) for which the mining history is to be displayed via the terminal 2 (step S31). The control unit 11 reads data such as the mining execution history for each of the mining machines 4 connected to the designated power grid and the power supply and demand histories in the grid from the databases for the designated power grid (step S32).

The control unit 11 generates a report screen representing the execution history of mining in the designated power grid and the power supply and demand histories in the designated power grid (step S33). As illustrated in FIG. 5, for example, the control unit 11 generates a report screen in which graphs representing in time series the power supply and demand values and the wholesale power prices, and the amount of mined cryptocurrency are shown, and the execution history for each mining machine 4 is shown in the list form. The control unit 11 outputs the generated report screen to the terminal 2 (step S34) and terminates the series of processing.

Though the present embodiment is described on the premise that an overload occurs in the grid S when the power generation facility G using renewable energy is interconnected, the present embodiment is not limited thereto. Supplying surplus power to the mining machines 4 can be a countermeasure against overload caused by the interconnection of a new fixed power source (power source P) such as a nuclear power plant, for example. That is, the grid S is not necessarily interconnected with the power generation facility G, and may not necessarily be interconnected with the power generation facility G using renewable energy.

As such, according to the first embodiment, by determining whether or not the supply power exceeds the grid capacity and/or whether or not a reverse power flow occurs in the grid S, the surplus power is so controlled as to be supplied to the mining machine 4. Consuming surplus power through mining can prevent damage to a facility caused by an overload of the grid S, for example. In addition, surplus power can optimally be consumed in remote islands and rural areas where electricity consumption is low. This makes it possible to optimally determine whether or not surplus power is generated and to optimally make good use of the surplus power.

According to the first embodiment, by placing the mining machine 4 in the substation T, which receives power supplied from the power generation facility G, surplus power can be consumed more favorably.

Furthermore, according to the first embodiment, the combined use with the power storage device 5 (energy storage device) enables more optimal consumption of surplus power.

Modified Example 1

In the first embodiment, the configuration is described in which the mining machines 4 are placed in the substation T, that is, the facility on the transmission and distribution operator's side. The mining machines 4, however, may be placed in the individual power generation facilities G so that mining is performed for each power generation facility G. In the present modified example, a configuration is described in which mining machines 4 (and power storage devices 5) are placed in the power generation facility G.

FIG. 8 is a schematic diagram illustrating an example of the configuration of the power generation facility G according to the modified example 1. The power generation facility G according to the modified example 1 includes a control device 32, a power generation module 41, a Power Conditioning Subsystem (PCS) 42, the mining machine 4 and the power storage device 5. The control device 32 is a controller that controls the output of the supply power from the power generation facility G and is connected to the network N. The power generation module 41 is a module that includes a solar panel or the like and generates power using sunlight. The PCS 42 is a converter that performs DC/AC conversion of the power generated by the power generation module 41 and is connected to a transmission line of the grid S through a switchboard (not illustrated) or the like.

The PCS 42 is connected to the mining machine 4 and the power storage device 5 and is configured to output power generated from the power generation module 41 to the grid S. The control device 32 controls the PCS 42 according to the control information from the server 1 to supply the power generated by the power generation module 41 to the transmission line or to the mining machine 4 and/or the power storage device 5.

As in the first embodiment, the server 1 determines whether or not the supply power exceeds the grid capacity and/or whether or not a reverse power flow occurs. If determining that t the grid capacity is exceeded, or if determining that a reverse power flow occurs, the server 1 controls the PCS 42 through the control device 32 of the power generation facility G to supply power to the mining machine 4 and/or the power storage device 5. This makes it possible to suppress power output to the grid S and prevent oversupply.

Though not especially described, the PCS 42 preferably supplies DC power to the mining machine 4 as it is without performing DC/AC conversion on the power generated by the power generation module 41. Directly supplying DC power to the mining machine 4 enables efficient use of renewable energy.

Since the modified example 1 is approximately the same as the first embodiment except for the site where the mining machines 4 and the power storage devices 5 are placed, the flowchart and the detailed description are not made in the modified example 1.

Modified Example 2

In the modified example, the configuration is described in which the mining machines 4 (and the power storage devices 5) are placed in the consumer facility C.

FIG. 9 is a schematic diagram illustrating an example of the configuration of the consumer facility C according to the modified example 2. The consumer facility C according to the modified example 2 includes a control device 33, the mining machine 4 and the power storage device 5. The control device 33 controls the power supplied to the mining machine 4 and the power storage device 5 and is configured to communicate with the server 1 through the network N, for example.

The consumer installed with the mining machines 4 is not limited to a particular consumer, but may preferably be a mining business operator who conducts cryptocurrency mining as a business. The mining business operator installs a large number of mining machines 4 in the consumer facility C and conducts mining by controlling the mining machines 4 through a business operator's terminal 9 such as a personal computer and a server computer.

As in the first embodiment, the server 1 determines whether or not the power supply exceeds the grid capacity and/or whether or not a reverse power flow occurs. If determining that the grid capacity is exceeded, or if determining that hat a reverse power flow occurs, the server 1 requests the cooperation of the mining business operator and supplies the surplus power to the mining machine 4 for consumption. That is, the server 1 controls the supply power via the control device 33 of the consumer facility C to supply the surplus power to the mining machine 4 and/or the power storage device 5. As such, surplus power may be consumed by a third party who is different from the power transmission and distribution business operator and the renewable energy power generation business operator.

Since the modified example 1 is approximately the same as the first embodiment except for the site where the mining machines 4 and the power storage devices 5 are placed, the flowchart and the detailed description are not made in the modified example 2.

Second Embodiment

The present embodiment describes a configuration in which the optimal placement (placement information) of the mining machine 4 is proposed to the manager so that the mining machine 4 is placed at an oversupply location where supply power is excessive in the grid S. The contents overlapping with the first embodiment are denoted by the same reference codes and the description thereof will not be repeated.

FIG. 10 illustrates the outline of a second embodiment. FIG. 10 conceptually illustrates the branching of the transmission and distribution network of the grid S. The outline of the present embodiment will be described with reference to FIG. 10.

The grid S is composed of a hierarchical and complex transmission and distribution network ranging from the upper grid 51 to the lower grid S2. In the present embodiment, the server 1 estimates the oversupply location of the grid S, which is expected to become oversupply state based on power supply exceeding the grid capacity or a reverse power flow, and proposes to place the mining machine 4 (and power storage device 5) in the relevant location to the manager (power transmission and distribution business operator).

The server 1 estimates the oversupply location where supply power is excessive with reference to the past supply information and demand information stored in the supply/demand DB 142 and grid capacity or the like at each location of the grid S stored in the grid DB 143. For example, the server 1 calculates the prediction values of the supply power and demand power and determines whether or not a reverse power flow occurs at each location as in the first embodiment. Furthermore, the server 1 compares the prediction value of the supply power with the grid capacity to determine whether or not the supply power exceeds the grid capacity. This allows the server 1 to estimate the oversupply location in the grid S as indicated by the bold line in FIG. 10.

If an oversupply location is estimated, the server 1 calculates the surplus power generated at the relevant location and decides the number of mining machines 4 to be placed in the relevant location so that the calculated surplus power can be consumed. As in the first embodiment, connection of the power storage device 5 may also be decided in addition to the mining machine 4. The server 1 reports to the terminal 2 the placement information indicating the decided placement location of the mining machine 4 and the decided number of the mining machines 4 to cause the terminal 2 to display the information. For example, the server 1 displays the connection diagram of the grid S representing the location where the mining machines 4 are to be connected and the number of mining machines 4 to thereby present the optimal placement of the mining machine 4 to the manager.

Here, the server 1 may propose to the manager that the mining machine 4 is to be placed in the consumer facility C that is supplied with supply voltage equal to or less than a certain value (e.g., 200V) as a candidate for a specific placement location of the mining machine 4 among the consumer facilities C located at the oversupply location estimated above.

The consumer facility C here assumed is the facility that is no longer used such as a closed school building or the like and the facility where mining machines 4 can be placed and where the voltage supplied from the transmission network is stepped-down to a certain value or below. A large number of mining machines 4 are necessary to be installed for consuming surplus power, and the closed school building or the like would be able to install a large number of mining machines 4. Meanwhile, mining machines 4 generally available are often not designed to withstand high voltages unlike large-scale manufacturing machines. Accordingly, facilities not provided with a distribution switchboard that steps down the supply voltage to a constant value or below are not suitable for the facility where mining machines 4 are located.

Hence, the server 1 proposes (outputs) to the manager placement information regarding the consumer facility C where a large number of mining machines 4 are placeable and voltage supplied from the transmission network is step-down to a certain value (e.g., 200V) or below as a location to be placed with the mining machine 4. For example, the server 1 stores information on the consumer facility C that meets the conditions described above in a database (such as a list of closed school buildings) (not illustrated) in association with the grid S, and selects and reports the consumer facility C located in the oversupply location based on the database. This makes it possible to optimally select the placement location of the mining machine 4.

Though as an example of the present embodiment, the consumer facility C is taken as the placement location of the mining machine 4, the substation T may be selected as a candidate for the placement location as shown in FIG. 10. Alternatively, the server 1 may select the power generation facility G as a candidate for the placement location. Thus, it is sufficient for the server 1 to be able to select and present the location where the mining machine 4 is to be located, and the location where the mining machine 4 is to be located is not limited to the consumer facility C.

FIG. 11 is a flowchart illustrating one example of a processing procedure executed by the server 1 according to the second embodiment.

The control unit 11 of the server 1 reads, from the databases such as the supply/demand DB 142, the grid DB 143 and the like, data such as the supply information indicating the past power supply values and demand information indicating the past power demand values in the grid S and grid capacities at each transmission line and each substation T that constitute the grid S (step S201). The control unit 11 estimates the oversupply location where the supply power exceeds the upper limit value in the grid S based on the acquired various data (step S202).

The control unit 11 calculates the excess of the supply power (surplus power) at the estimated oversupply location and decides the placement location of the mining machine 4 (and power storage device 5) and the number of mining machines 4 so that the calculated supply power can be consumed (step S203). The control unit 11 outputs to the terminal 2 the decided placement information indicating the location of placing the mining machine 4 and the number of mining machines 4 (step S204), and terminates the series of processing.

As such, according to the second embodiment, optimal placement of the mining machine 4 can be presented to the manager.

Third Embodiment

In the present embodiment, the configuration is described in which the mined cryptocurrency is allocated between the supplier (consumer, power generation business operator or the like) who supplies electricity to the grid S from the power generation facility G and the manager (electric power company or the like) who manages the grid S.

FIG. 12 illustrates the outline of a third embodiment. FIG. 12 conceptually illustrates the situation where the mined cryptocurrency is allocated between the supplier and the manager. The outline of the third embodiment will be described with reference to FIG. 12.

As described in the first embodiment, the server 1 supplies the power supply (surplus power) from the power generation facility G to the mining machines 4 to cause them to perform mining. Though the manager (electric power company) may make a payment in legal tender or the like to purchase power from the suppliers in this case, the manager, in the present embodiment, pays the purchase price of the supply power with a part of the mined cryptocurrency and earns the remaining amount of the cryptocurrency corresponding to the profit.

In order to achieve the above-mentioned processing on the blockchain, the server 1 creates a smart contract for allocating the mined cryptocurrency between the manager and the supplier and outputs (broadcasts) the contract to each of the nodes of the blockchain that verify the transaction. The smart contract is a program that automatically enforces the contract according to the contractual terms and conditions agreed in advance between the parties. The server 1 agrees the content of the contract with the supplier in advance to generate a smart contract (i.e., a contract account in the case of Ethereum) and broadcasts the smart contract to each node to record it on the blockchain.

For example, the server 1 makes agreement beforehand with the supplier about the purchase price of electric power per unit quantity when the manager purchases electric power from the supplier. As in the first embodiment, the server 1 determines whether or not the (estimated value of) power supply exceeds the upper limit value and decides the supply amount of surplus power supplied from the power generation facility G to the mining machine 4. The server 1 then calculates the purchase price when the excess of the surplus power decided above is purchased based on the agreed purchase price per unit quantity. The server 1 generates a smart contract that allocates the cryptocurrency to be mined in accordance with this purchase price.

For example, the server 1 generates, in each node of the blockchain, a smart contract that executes processing of comparing the above-described purchase price with the mined amount of the cryptocurrency to determine whether or not the profit is earned from mining, and sending, if the profit is earned, the amount of the cryptocurrency corresponding to the purchase price to the supplier and sending the amount of the cryptocurrency corresponding to the profit amount to the manager. Here, each node needs rate information for converting the cryptocurrency to the legal tender. For example, various methods are conceivable including referring to the rate information from a reliable external API (third party), or preparing and referring to another smart contract (data field contract) in the blockchain where multiple users make agreements to update the rate information sequentially.

The server 1 broadcasts the smart contract generated above to each node of the blockchain. Each node of the blockchain verifies the smart contract and records it in the blockchain if there is no problem.

The server 1 then supplies the surplus power to the mining machines 4 to cause it to perform mining. The server 1 then generates a transaction that sends the mined cryptocurrency to the smart contract described above and broadcasts the transaction. Each node that obtains the transaction calls and executes the smart contract that has previously been recorded, calculates the legal tender value of the mined cryptocurrency and determines whether or not a profit is earned by comparing the legal tender value with the purchase price described above. Each node then generates a transaction that sends the cryptocurrency corresponding to the purchase price to the supplier according to the smart contract and sends the cryptocurrency corresponding to the profit amount to the manager, and records it on the blockchain.

Though not especially described above, there is a possibility that the value of the mined cryptocurrency may be less than the purchase price, and no profit is earned. In this case, various measures are conceivable as sending all the mined cryptocurrency to the supplier and compensating (sending) the cryptocurrency corresponding to the amount of the shortage from the manager's wallet.

Figure 13:
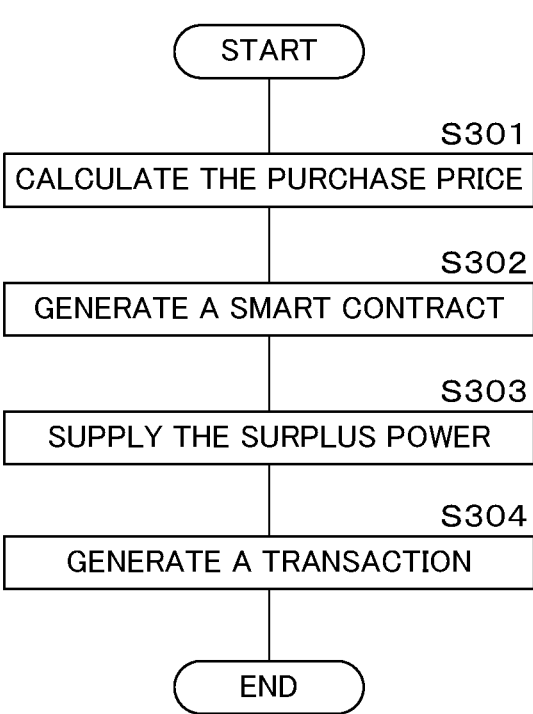
FIG. 13 is a flowchart illustrating one example of a processing procedure executed by a server according to the third embodiment.

FIG. 13 is a flowchart illustrating one example of a processing procedure executed by the server 1 according to the third embodiment. The control unit 11 of the server 1 executes the following processing if determining that the supply power exceeds the upper limit value and supplying the surplus power from the power generation facility G to the mining machines 4 to cause it to perform mining according to the processing of the first embodiment.

The control unit 11 calculates the purchase price of the surplus power based on the purchase price of the electric power per unit quantity agreed with the supplier beforehand and the amount of surplus power supplied from the power generation facility G to the mining machines 4 (step S301). The control unit 11 generates a smart contract for allocating the mined cryptocurrency with the supplier based on the calculated purchase price and outputs the smart contract to each of the nodes of the blockchain (step S302). For example, the control unit 11 generates a smart contract for sending, out of the mined cryptocurrency, the amount of cryptocurrency corresponding to the power supply by the supplier (power generation facility G) to the supplier and sends the remaining amount of the cryptocurrency to the manager. The control unit 11 broadcasts the smart contract to each of the nodes for verification (mining) and records it on the blockchain.

The control unit 11 supplies the surplus power to the mining machines 4 to cause it to perform the mining (step S303). The control unit 11 generates a transaction that sends the mined cryptocurrency to the smart contract generated at step S302 and outputs the transaction to each node (step S304). Each node that obtains the transaction calls and executes the smart contract recorded on the blockchain at step S302 to generate a transaction where the mined cryptocurrency is allocated between and sent to the manager and the supplier. The control part 11 terminates the series of processing.

As such, according to the third embodiment, profits can be distributed on the blockchain that is resistant to tampering, which enables optimal enforcement of the series of systems.

Fourth Embodiment

The first embodiment describes a configuration in which a blockchain network is taken as an example of a distributed computing system, and surplus power is supplied to the mining machines 4 (first computing device) that mine cryptocurrency (first cryptocurrency). The present embodiment describes a configuration in which a blockchain network where a computational task (e.g., genome analysis, machine learning and the like), which is different from mining and is requested (asked) by any user, is executed by a large number of node computers is taken as an example of a distributed computing system, and surplus power is supplied to the node computers (second computing devices) that constitute the network.

Figure 14:
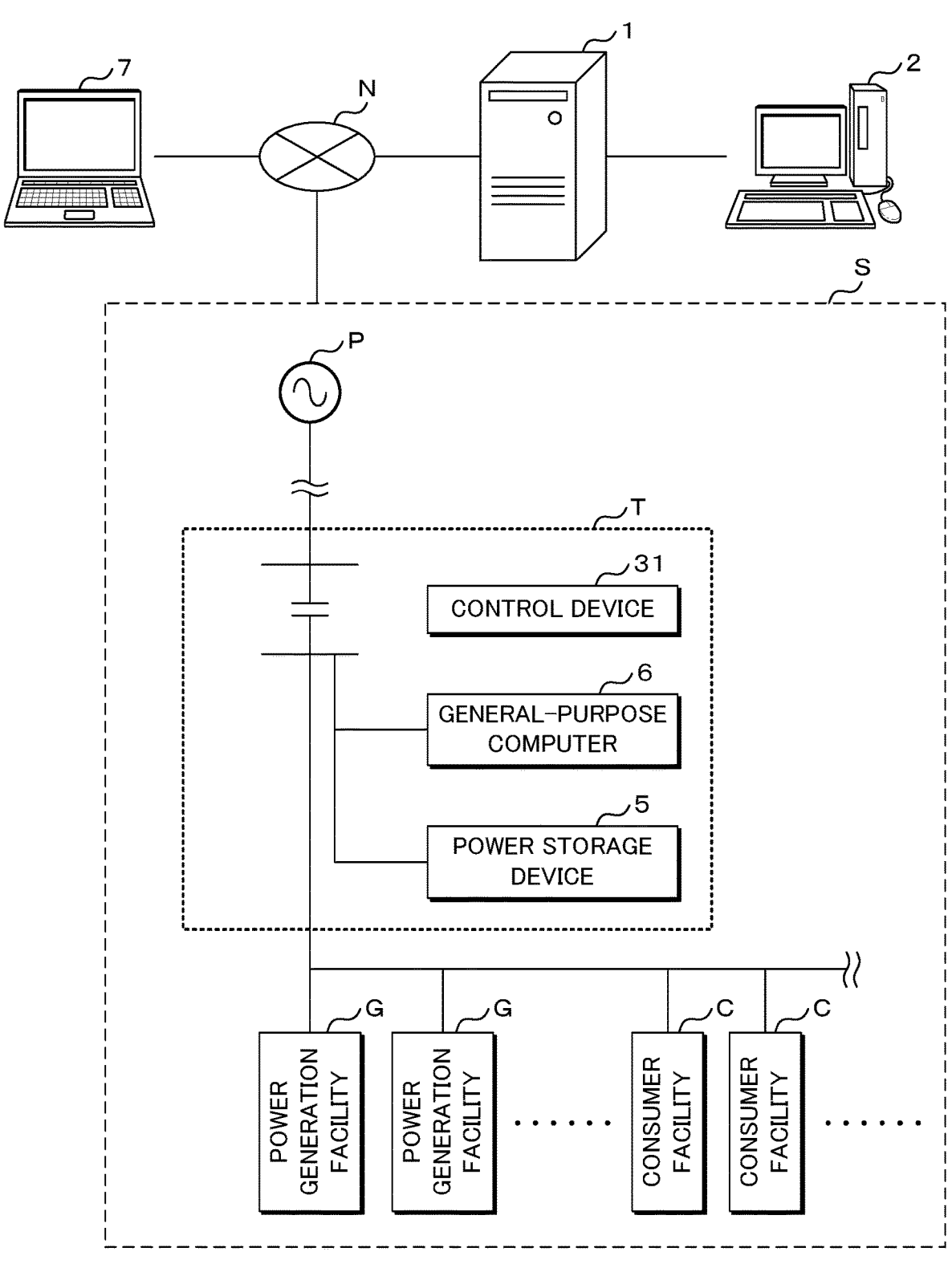
FIG. 14 is a schematic diagram illustrating one example of the configuration of a power system according to a fourth embodiment.

FIG. 14 is a schematic diagram illustrating one example of the configuration of a power system according to a fourth embodiment. The power system according to the present embodiment includes a general-purpose computer 6 and a user terminal 7. In the present embodiment, the distributed computing system in which a computational task requested by the user terminal 7 is executed by a large number of general-purpose computers 6 is taken as an example, and surplus power is supplied to the general-purpose computers 6.

The general-purpose computer 6 is a computer having an arithmetic processing unit such as a CPU, a GPU, a Field Programmable Gate Array (FPGA) and the like and corresponds to a personal computer, a tablet terminal or the like. Note that the computing device corresponding to the general-purpose computer 6 needs only to be a computer equipped with an arithmetic processing unit such as a CPU and the like, or it may be a dedicated computer such as a game console, for example. The general-purpose computer 6 is installed in the substation T instead of the mining machine 4 and can receive electric power from the transmission network. Though FIG. 14 illustrates a single general-purpose computer 6, the description is made assuming that multiple general-purpose computers 6 are installed in practice. In addition, the general-purpose computers 6 are described as being communicably connected to the network N.

The user terminal 7 is a terminal device of the user who requests (asks) the general-purpose computers 6 to perform a computational task and corresponds to a personal computer, for example. The user terminal 7 requests a large number of computers connected to the network N including the general-purpose computers 6 to perform a computational task. The contents of the computational task are not limited to particular ones, but may presumably be tasks that require large-scale computational processing such as genome analysis and machine learning, for example. Each computer executes a part of the computational task requested by the user terminal 7 and outputs the computation result to the user terminal 7.

FIG. 15 is a block diagram illustrating one example of the configuration of the server 1 according to the fourth embodiment. The auxiliary storage 4 of the server 1 according to the present embodiment stores a computer DB 147 instead of the mining machine DB 144. The computer DB 147 is a database that stores information on the general-purpose computers 6 installed in the substation T.

FIG. 16 illustrates one example of a record layout of the computer DB 147. The computer DB 147 includes a computer ID column, a connection column, a power consumption column, a task column and an execution history column. The computer ID column stores computer IDs used to identify each general-purpose computer 6. The connection column, power consumption column, task column and execution history column store, in association with the computer IDs, the location where each general-purpose computer 6 is connected (placed) in the grid S, the power consumption per unit time of each general-purpose computer 6, task information on the computational task that is requested (asked) and the execution history of the computational task. For example, the task column contains information on the task name of a computational task, the execution deadline and the reward paid by the user when the task is completed. The execution history column stores the results of the computation (e.g., the percentage of the computational task executed by the general-purpose computer 6) in association with the execution date of the computational task, for example.

FIG. 17 illustrates the outline of the fourth embodiment. The outline of the present embodiment will be described with reference to FIG. 17.

As described above, the general-purpose computer 6 receives a request from the user terminal 7 and executes a part of a predetermined computational task. More specifically, the general-purpose computer 6 and the user terminal 7 function as nodes that constitute a blockchain network related to predetermined cryptocurrency (second cryptocurrency). The general-purpose computer 6 acquires an execution request of the computational task from the user terminal 7 through a peer-to-peer (P2P) communication. The general-purpose computer 6 executes a part of the computational task requested by the user terminal 7 and outputs the computation result to the user terminal 7 via the blockchain network. The general-purpose computer 6 is paid as the reward for the computation result in the cryptocurrency implemented in the blockchain network. It should be noted that the "reward" here is not a reward from mining.

The blockchain network described above is a distributed computing platform (golem, sonm or the like) using Ethereum cryptocurrency and is a network in which multiple node computers distributively execute the computational task requested by any user. Note that the cryptocurrency may be Bitcoin or other altcoins, not limited to Ethereum cryptocurrency, or may be the cryptocurrency unique to this system. This blockchain network acts as a platform to achieve distributed computing and autonomously performs requesting, agreeing and paying for the computational task.

The cryptocurrency (second cryptocurrency) according to the present embodiment may be the same as or different from the cryptocurrency (first cryptocurrency) mined by the mining machine 4 according to the first embodiment. In addition, the general-purpose computer 6 (and the user terminal 7) may or may not mine cryptocurrency.

The user terminal 7 broadcasts (outputs) the data of a predetermined computational task to the blockchain network and requests any computer participating in the network to execute a computational task. The general-purpose computer 6 generates a smart contract with the user terminal 7 when undertaking the computational task requested by the user terminal 7. The smart contract is a contract that specifies, for example, the content of the computational task to be executed, the execution deadline for the task and the reward to be paid. For example, the user terminal 7 generates a UTXO with a smart contract that deposits the cryptocurrency as a reward. Then, the general-purpose computer 6 generates a contract by entry of the digital signature into the UTXO. The user terminal 7 generates a smart contract with each node computer including the general-purpose computer 6 and assigns a part of the computational task to each node computer.

The general-purpose computer 6 executes the part of the computational task accepted from the user terminal 7. In this case, the general-purpose computer 6 receives the supply of surplus power to execute the computation as in the mining machine 4 according to the first embodiment. That is, the server 1 determines whether or not the grid capacity of the grid S is exceeded and/or whether or not a reverse power flow occurs, based on the supply information on the supply power supplied to the grid S. If determining that the grid capacity is exceeded, or if determining that a reverse power flow occurs, the server 1 controls the control device 31 to supply surplus power to the general-purpose computer 6. In this case, the server 1 may decide the allocation of the amount of the electric power to be supplied to the general-purpose computer 6 and the power storage device 5 with reference to the market value information of the cryptocurrency and the market value information of the wholesale electricity price, as in the first embodiment.

If completing a part of the computational task assigned to the device of its own, the general-purpose computer 6 outputs the computation result to the user terminal 7 through the blockchain network. If acquiring the computation result from the general-purpose computer 6, the user terminal 7 pays the reward in cryptocurrency. For example, the user terminal 7 enters an electronic signature to the UTXO where the cryptocurrency is deposited as described above, which allows the general-purpose computer 6 to obtain the cryptocurrency.

As described above, the computing devices that receive surplus power are not limited to the mining machines 4 that mine cryptocurrency, but may be the general-purpose computers 6 that distributively execute any computational task different from mining.

Though the autonomous decentralized control system using the blockchain is described above as an example, the present embodiment may be a centralized system, not limited thereto. In other words, the server computer (i.e., the server 1) that manages the entire system may accept a request for a computational task from the user terminal 7 and partially assign the task to the multiple general-purpose computers 6. Hence, it is sufficient for multiple general-purpose computers 6 to partially execute a computational task, and the system is not necessarily the system using the blockchain.

FIG. 18 is a flowchart illustrating one example of the processing procedure executed by the power system according to the fourth embodiment. The contents of the processing to be executed by the power system according to the present embodiment will be described with reference to FIG. 18.

The general-purpose computers 6 each receive an execution request of a computational task from the user terminal 7 (step S401). Specifically, the general-purpose computers 6 are node computers that constitute the blockchain network and each acquire the execution request of the computational task from the user terminal 7 through the blockchain network. Each of the general-purpose computers 6 sends task information on the computational task requested by the user terminal 7 to the server 1 (step S402). The server 1 stores the task information sent from the general-purpose computer 6 to the computer DB 147 (step S403).

The server 1 acquires supply information on the supply power supplied to the grid S (step S404). The control unit 11 determines whether or not the supply power exceeds the grid capacity of the grid S with reference to the grid DB 143 (step S405).

If determining that the grid capacity is not exceeded (S405: NO), the control unit 11 acquires demand information indicating the demand power to be consumed at each customer facility C (step S406). The control unit 11 determines whether or not a reverse power flow occurs with reference to the supply information and the demand information (step S407). If determining that a reverse power flow does not occur (S407: NO), the control unit 11 terminates the series of processing.

If determining that the supply power exceeds the grid capacity (S405: YES), or if determining that a reverse power flow occurs (S407: YES), the control unit 11 calculates an excess of the supply power (step S408). The control unit 11 decides the allocation of the power supply amount to be supplied to the general-purpose computers 6 and/or the power storage devices 5 such that the surplus power is consumed (step S409). The control unit 11 controls the power supply via the control unit 31 so that the surplus power is supplied to the general-purpose computers 6 and/or the power storage devices 5 at the decided allocation (step S410) and terminates the series of processing. If supplied with the surplus power, the general-purpose computers 6 each execute a part of the computation of the computational task requested by the user terminal 7 (step S411) and terminate the series of processing.

As such, according to the fourth embodiment, by supplying surplus power to the general-purpose computers 6 in the distributed computing system that execute a predetermined computational task, the surplus power can optimally be consumed.

In addition, according to the fourth embodiment, the autonomous decentralized control system using blockchain is employed to autonomously perform a request for a computational task, an agreement and a payment of a reward.

Modified Example 3

The first embodiment describes a configuration in which surplus power is supplied to the mining machines 4 while the fourth embodiment describes a configuration in which surplus power is supplied to the general-purpose computers 6. The modified example describes a configuration in which surplus power is distributively supplied to the mining machines 4 and the general-purpose computers 6.

FIG. 19 is a schematic diagram illustrating one example of the configuration of a power system according to a modified example 3. The power system according to the present embodiment includes a mining machine 4 and a general-purpose computer 6 (and a power storage device 5) that are installed alongside. Note that the mining machine 4 and the general-purpose computer 6 need not be installed in the same location, but may be installed in different interconnection locations. In the present modified example, if supply power exceeds the grid capacity of the grid S and/or if a reverse power flow occurs, the server 1 distributively supplies the surplus power to the mining machine 4 and the general-purpose computer 6 (and power storage device 5).

The method of supplying (allocating) surplus power is not limited to a particular method. For example, the server 1 decides the allocation of power to be supplied to the mining machines 4 and the general-purpose computers 6 based on the market value information of the cryptocurrency (hereinafter referred to as the "first cryptocurrency") mined by the mining machines 4 and the market value information of the cryptocurrency (hereinafter referred to as the "second cryptocurrency") earned from the computational task executed by the general-purpose computers 6.

For example, the server 1 multiplies the current market value (the price per unit quantity traded on cryptocurrency exchanges or the like) of the first cryptocurrency to be mined by the mining machines 4 by the expected quantity of mining per unit hour, to calculate an expected value of the earnings obtained from mining. In addition, the server 1 multiplies the current market value of the second cryptocurrency by the reward (the quantity of the second cryptocurrency) paid by the user who requests (asks) the computational task, to calculate an expected value of the earnings obtained from the execution of the computational task. The server 1 decides the allocation of the supply power in accordance with both of the expected values.

Although the supply/allocation of surplus power is decided based on the market value information of the first cryptocurrency and the second cryptocurrency, the present embodiment is not limited to this method. For example, the server 1 may allocate electric power by setting priorities based on the power consumption per unit time of the mining machine 4 and the general-purpose computer 6. Specifically, electric power may preferentially be supplied to the computing device (e.g., mining machine 4) that relatively consumes more power if there is a large surplus power and may preferentially be supplied to the computing device (e.g., general-purpose computer 6) that relatively consumes less power if there is a small surplus power. For example, the server 1 may preferentially allocate electric power to the general-purpose computer 6 if the execution deadline for a computational task that is requested (asked) by the user is approaching. Such allocation of surplus power based on the market value information is an example, and the allocation may be decided based on another information.

Sine the present modified example is similar to the first to fourth embodiments other than the description above, the detailed descriptions such as a flowchart and the like are not made in this modified example.

As such, according to the modified example 3, mining and computational tasks other than mining using surplus power may simultaneously be performed by employing both of the mining machines 4 and the general-purpose computers 6 in combination.

Fifth Embodiment

The first to fourth embodiments describe the configuration in which the power transmission and distribution business operator predominantly performs mining or the like based on surplus power. The present embodiment describes a configuration in which in the case where the transmission and distribution business operator that manages the power grid and the owner (preferably the mining business operator) of the computing device such as the mining machine 4 are different, an intermediary mediates the transactions between them.

FIG. 20 is a schematic diagram illustrating one example of the configuration of a power system according to the fifth embodiment. The outline of the present embodiment will be described with reference to FIG. 20.

In the present embodiment, the mining machine 4 is installed in the consumer facility C as described in the modified example 2. Preferably, the consumer of the consumer facility C is a mining business operator, and a large number of mining machines 4 are installed in the consumer facility C.

The power system according to the present embodiment has an intermediary server 8. The intermediary server 8 is a server computer for an intermediary that mediates electricity transactions between the power transmission and distribution business operator and the mining business operator (owner of the mining machines 4). The intermediary server 8 is a server computer that accepts a power selling request for surplus power from the power transmission and distribution business operator and a power purchasing request from the mining business operator for conclusion of the trading of electricity. The intermediary is an intermediary business operator such as the Japan Electric Power Exchange, for example, though not limited to particular one. For example, the power transmission and distribution business operator (electric power companies or the like) may also serve as an intermediary.

In the present embodiment, the server 1 determines whether or not surplus power is to be supplied to the mining machine 4 by determining whether or not the supply power exceeds the grid capacity and/or whether or not a reverse power flow occurs as in the first embodiment. Here, the server 1 outputs to the intermediary server 8 a power selling request that requests selling of surplus power if supplying the surplus power to the mining machine 4. The power selling request is an offer to sell power and includes information such as a sale price of power, the amount of selling power (supply amount of surplus power) and a time slot when power is to be supplied.

Meanwhile, the business operator's terminal 9 of the mining business operator outputs to the intermediary server 8 a power purchasing request that requests purchasing of surplus power. The power purchasing request is an offer to purchase power and includes information such as a purchase price of power, the amount of purchasing power (supply amount) and a time slot when power is to be supplied. The intermediary server 8 has accepted in advance a power purchasing request from the mining business operator who interconnected the mining machine 4 to the grid S and stored it in a database (not illustrated).

If acquiring a power selling request for surplus power from the server 1 of the power transmission and distribution business operator, the intermediary server 8 matches the power purchasing request accepted in advance with the power selling request and determines whether or not trading of the surplus power is to be concluded. For example, the intermediary server 8 determines whether or not the purchase price and the sale price of surplus power match. Furthermore, the intermediary server 8 may determine whether matching is established in the supply amount of surplus power (the amount of purchasing and selling power) and the time slot when power is supplied or the like.

If determining that the trading of surplus power is to be concluded, the intermediary server 8 reports the determination result to the server 1 and the business operator's terminal 9. In this case, the server 1 performs control so that surplus power is supplied to the mining machine 4 of the counterparty (the mining business operator) with which the trading is concluded. Specifically, the server 1 outputs control information to the control device 33 through the network N and performs control such that supply of surplus power from the grid S is received and used for execution of the mining.

As described above, if the power transmission and distribution business operator and the owner of the mining machine 4 are different, offers to sell and purchase surplus power may be accepted from both of the parties for conducting trade between them. This makes it possible to create a new electricity market based on surplus power.

Though the description is made regarding the computing device as the mining machine 4 in the present embodiment, the computing device may be a general-purpose computer 6 that executes a computational task related to distributed computing as in the fourth embodiment.

FIG. 21 is a flowchart illustrating one example of a processing procedure executed by the intermediary server 8. The contents of processing to be executed by the intermediary server 8 will be described with reference to FIG. 21.

The intermediary server 8 acquires a power purchasing request indicating the purchase price of surplus power, the amount of purchasing power and the time slot, from the business operator's terminal 9 of the mining business operator that owns the mining machine 4 (step S501). The intermediary server 8 stores the information on the acquired power purchasing request (step S502).

The intermediary server 8 acquires a power selling request indicating the sale price of surplus power, the amount of selling power and the time slot, from the server 1 (power transmission and distribution business operator) that manages the transmission and distribution of power in the grid S (step S503). As described above, the server 1 outputs a power selling request if determining that the supply power in the grid S exceeds the grid capacity, or if a reverse power flow occurs. The intermediary server 8 accepts the power selling request.

The intermediary server 8 matches the power purchasing request stored at step S502 with the power selling request acquired at step S503 and determines whether or not the trading of surplus power is to be concluded (step S504). For example, the intermediary server 8 determines whether or not trading is to be concluded based on the supply amount (the amount of purchasing power and the amount of selling power) and the time slots that both of the parties request other than the purchase price and sale price of surplus power. If determining that the trading is to be concluded (S504: YES), the intermediary server 8 reports to the server 1 and the business operator's terminal 9 that the transaction is concluded (step S505). In this case, the business operator's terminal 9 causes the mining machine 4 to execute the mining by the surplus power via the control device 33. After execution of the processing at step S505, or if NO is determined at step S504, the intermediary server 8 terminates the series of processing.

As such, according to the fifth embodiment, surplus power can optimally be consumed, and trading of surplus power can favorably be performed.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A control method for causing a computer to execute processing of:

acquiring supply information indicating supply power supplied to a power grid and grid information indicating a grid capacity of the power grid;

determining whether or not the supply power exceeds the grid capacity based on the supply information and the grid information; and determining that when the grid capacity is exceeded, performing control so that surplus power exceeding the grid capacity is supplied to a first computing device and a second computing device constituting a predetermined distributed computing system;

wherein the distributed computing system includes a first blockchain network that performs mining of first cryptocurrency by the first computing device, and a system comprising the second computing device and a third computing device in which, using a second blockchain network, the third computing device requests the second computing device to execute a part of a computational task, and a reward from the third computing device to said second computing device is paid in second cryptocurrency, the control method further causing the computer to execute processing of:

acquiring market value information of the first cryptocurrency and the second cryptocurrency;

deciding allocation of the surplus power to be supplied to the first computing device and to the second computing device based on the market value information; and performing control so that the surplus power is supplied to the first computing device and the second computing device in the decided allocation.

2. The control method according to claim 1, wherein the first computing device is placed in a substation facility that receives the supply power, the control method further causing the computer to execute processing of outputting control information indicating that the surplus power is to be supplied to the first computing device, to a control device controlling power to be supplied to the first computing device placed in the substation facility.

3. The control method according to claim 1, wherein the power grid is a power grid interconnected with a power generation facility using renewable energy, the control method further causing the computer to execute processing of performing control so that the surplus power from the power generation facility is supplied to the first computing device.

4. The control method according to claim 3, wherein the first computing device is located in the power generation facility, the control method further causing the computer to execute processing of outputting control information indicating that the surplus power is to be supplied to the first computing device, to a control device controlling output of supply power from the power generation facility.

5. The control method according to claim 1, further causing the computer to execute processing of performing control so that the surplus power is allocated to the first computing device and an energy storage device.

6. The control method according to claim 1, further causing the computer to execute processing of:

an oversupply location where the surplus power occurs in the power grid based on the supply information; and outputting placement information indicating that the first computing device is to be placed at the oversupply location.

7. The control method according to claim 6, further causing the computer to execute processing of outputting the placement information indicating that out of consumer facilities located in the oversupply location, one of the consumer facilities having supply voltage less than a preset value is regarded as a location where the first computing device is to be placed.

8. The control method according to claim 1, further causing the computer to execute processing of:

outputting a power selling request for the surplus power to an intermediary device that accepts a power purchasing request for the surplus power from an owner of the first computing device in a case where the surplus power is to be supplied to the first computing device;

acquiring a determination result as to whether or not trading of the surplus power is to be concluded, from the intermediary device; and performing control so that the surplus power is supplied to the first computing device if acquiring a determination result that the trading is concluded.

9. A control method for causing a computer to execute processing of:

acquiring supply information indicating supply power supplied to a power grid and demand information indicating demand power in the power grid;

determining whether or not a reverse power flow occurs in the power grid based on the supply information and the demand information; and determining that when a reverse power flow occurs, performing control so that surplus power exceeding the demand power is supplied to a first computing device and a second computing device constituting a predetermined distributed computing system;

wherein the distributed computing system includes a first blockchain network that performs mining of first cryptocurrency by the first computing device, and a system comprising the second computing device and a third computing device in which, using a second blockchain network, the third computing device requests the second computing device to execute a part of a computational task, and a reward from the third computing device to said second computing device is paid in second cryptocurrency, the control method further causing the computer to execute processing of:

acquiring market value information of the first cryptocurrency and the second cryptocurrency;

deciding allocation of the surplus power to be supplied to the first computing device and to the second computing device based on the market value information; and performing control so that the surplus power is supplied to the first computing device and the second computing device in the decided allocation.

10. The control method according to claim 9, wherein the first computing device is placed in a substation facility that receives the supply power, the control method further causing the computer to execute processing of outputting control information indicating that the surplus power is to be supplied to the first computing device, to a control device controlling power to be supplied to the first computing device placed in the substation facility.

11. The control method according to claim 9, wherein the power grid is a power grid interconnected with a power generation facility using renewable energy, the control method further causing the computer to execute processing of performing control so that the surplus power from the power generation facility is supplied to the first computing device.

12. The control method according to claim 11, wherein the first computing device is located in the power generation facility, the control method further causing the computer to execute processing of outputting control information indicating that the surplus power is to be supplied to the first computing device, to a control device controlling output of supply power from the power generation facility.

13. The control method according to claim 9, further causing the computer to execute processing of performing control so that the surplus power is allocated to the first computing device and an energy storage device.

14. The control method according to claim 9, further causing the computer to execute processing of:

estimating an oversupply location where the surplus power occurs in the power grid based on the supply information; and outputting placement information indicating that the first computing device is to be placed at the oversupply location.

15. The control method according to claim 14, further causing the computer to execute processing of outputting the placement information indicating that out of consumer facilities located in the oversupply location, one of the consumer facilities having supply voltage less than a preset value is regarded as a location where the first computing device is to be placed.

16. The control method according to claim 9, further causing the computer to execute processing of:

outputting a power selling request for the surplus power to an intermediary device that accepts a power purchasing request for the surplus power from an owner of the first computing device in a case where the surplus power is to be supplied to the first computing device;

acquiring a determination result as to whether or not trading of the surplus power is to be concluded, from the intermediary device; and performing control so that the surplus power is supplied to the first computing device if acquiring a determination result that the trading is concluded.

17. A management device comprising at least one processor, wherein the at least one processor is configured to:

acquire supply information indicating supply power supplied to a power grid and grid information indicating a grid capacity of the power grid;

determine whether or not the supply power exceeds the grid capacity based on the supply information and the grid information; and determine that when the grid capacity is exceeded, perform control so that surplus power exceeding the grid capacity is supplied to a first computing device and a second computing device constituting a predetermined distributed computing system;

wherein the distributed computing system includes a first blockchain network that performs mining of first cryptocurrency by the first computing device, and a system comprising the second computing device and a third computing device in which, using a second blockchain network, the third computing device requests the second computing device to execute a part of a computational task, and a reward from the third computing device to said second computing device is paid in second cryptocurrency, and the at least one processor is further configured to:

acquire market value information of the first cryptocurrency and the second cryptocurrency;

decide allocation of the surplus power to be supplied to the first computing device and to the second computing device based on the market value information; and perform control so that the surplus power is supplied to the first computing device and the second computing device in the decided allocation.

18. A management device comprising at least one processor, wherein the at least one processor is configured to:

acquire supply information indicating supply power supplied to a power grid and demand information indicating demand power in the power grid;

determine whether or not a reverse power flow occurs in the power grid based on the supply information and the demand information; and determine that when a reverse power flow occurs, perform control so that surplus power exceeding the demand power is supplied to a first computing device and a second computing device constituting a predetermined distributed computing system;

wherein the distributed computing system includes a first blockchain network that performs mining of first cryptocurrency by the first computing device, and a system comprising the second computing device and a third computing device in which, using a second blockchain network, the third computing device requests the second computing device to execute a part of a computational task, and a reward from the third computing device to said second computing device is paid in second cryptocurrency, and the at least one processor is further configured to:

acquire market value information of the first cryptocurrency and the second cryptocurrency;

decide allocation of the surplus power to be supplied to the first computing device and to the second computing device based on the market value information; and perform control so that the surplus power is supplied to the first computing device and the second computing device in the decided allocation.

19. A non-transitory computer-readable storage medium storing a program causing a computer to execute processing of:

acquiring supply information indicating supply power supplied to a power grid and grid information indicating a grid capacity of the power grid;

determining whether or not the supply power exceeds the grid capacity based on the supply information and the grid information; and determining that when the grid capacity is exceeded, performing control so that surplus power exceeding the grid capacity is supplied to a first computing device and a second computing device constituting a predetermined distributed computing system;

wherein the distributed computing system includes a first blockchain network that performs mining of first cryptocurrency by the first computing device, and a system comprising the second computing device and a third computing device in which, using a second blockchain network, the third computing device requests the second computing device to execute a part of a computational task, and a reward from the third computing device to said second computing device is paid in second cryptocurrency, the program further causing the computer to execute processing of:

acquiring market value information of the first cryptocurrency and the second cryptocurrency;

deciding allocation of the surplus power to be supplied to the first computing device and to the second computing device based on the market value information; and performing control so that the surplus power is supplied to the first computing device and the second computing device in the decided allocation.

20. A non-transitory computer-readable storage medium storing a program causing a computer to execute processing of:

acquiring supply information indicating supply power supplied to a power grid and demand information indicating demand power in the power grid;

determining whether or not a reverse power flow occurs in the power grid based on the supply information and the demand information; and determining that when a reverse power flow occurs, performing control so that surplus power exceeding the demand power is supplied to a first computing device and a second computing device constituting a predetermined distributed computing system;

wherein the distributed computing system includes a first blockchain network that performs mining of first cryptocurrency by the first computing device, and a system comprising the second computing device and a third computing device in which, using a second blockchain network, the third computing device requests the second computing device to execute a part of a computational task, and a reward from the third computing device to said second computing device is paid in second cryptocurrency, the program further causing the computer to execute processing of:

acquiring market value information of the first cryptocurrency and the second cryptocurrency;

deciding allocation of the surplus power to be supplied to the first computing device and to the second computing device based on the market value information; and performing control so that the surplus power is supplied to the first computing device and the second computing device in the decided allocation.

21. A power system having a management device managing transmission and distribution of power in a power grid and a first computing device and a second computing device constituting a predetermined distributed computing system, wherein the management device comprises at least one processor; wherein the at least one processor is configured to:

acquire supply information indicating supply power supplied to the power grid and grid information indicating a grid capacity of the power grid, determine whether or not the supply power exceeds the grid capacity based on the supply information and the grid information, and determine that when the grid capacity is exceeded, perform control so that surplus power exceeding the grid capacity is supplied to the first computing device and the second computing device;

wherein the distributed computing system includes a first blockchain network that performs mining of first cryptocurrency by the first computing device, and a system comprising the second computing device and a third computing device in which, using a second blockchain network, the third computing device requests the second computing device to execute a part of a computational task, and a reward from the third computing device to said second computing device is paid in second cryptocurrency, and the at least one processor is further configured to:

acquire market value information of the first cryptocurrency and the second cryptocurrency;

decide allocation of the surplus power to be supplied to the first computing device and to the second computing device based on the market value information; and perform control so that the surplus power is supplied to the first computing device and the second computing device in the decided allocation.

22. A power system having a management device managing transmission and distribution of power in a power grid and a first computing device and a second computing device constituting a predetermined distributed computing system, wherein the management device comprises at least one processor, wherein the at least one processor is configured to:

acquire supply information indicating supply power supplied to the power grid and demand information indicating demand power in the power grid, determine whether or not a reverse power flow occurs in the power grid based on the supply information and the demand information, and determine that when a reverse power flow occurs, perform control so that surplus power exceeding the demand power is supplied to the first computing device and the second computing device constituting the predetermined distributed computing system;

wherein the distributed computing system includes a first blockchain network that performs mining of first cryptocurrency by the first computing device, and a system comprising the second computing device and a third computing device in which, using a second blockchain network, the third computing device requests the second computing device to execute a part of a computational task, and a reward from the third computing device to said second computing device is paid in second cryptocurrency, and the at least one processor is further configured to:

acquire market value information of the first cryptocurrency and the second cryptocurrency;

decide allocation of the surplus power to be supplied to the first computing device and to the second computing device based on the market value information; and perform control so that the surplus power is supplied to the first computing device and the second computing device in the decided allocation.

* * * * *